United States Patent [19]
Herbrechtsmeier et al.

[11] Patent Number: 6,113,817
[45] Date of Patent: Sep. 5, 2000

[54] MOLDING PROCESSES

[75] Inventors: Peter Herbrechtsmeier, Königstein/Ts.; Karl Baur, Kornwestheim; Roger Biel, Frankfurt/M.; John Golby, Aschaffenburg; Roland Hauck, Hohenfels; Peter Hagmann, Erlenbach/M.; Axel Heinrich, Schaafheim; Otto Kretzschmar, Einhausen; Anette Lang, Grossostheim; Achim Müller, Aschaffenburg; Thomas Schulz, Neu-Isenburg; Bernhard Seiferling, Goldbach; Werner Steffan, Eichenbuehl, all of Germany

[73] Assignee: Novartis AG, Basel, Switzerland

[21] Appl. No.: 09/047,041

[22] Filed: Mar. 24, 1998

Related U.S. Application Data

[60] Provisional application No. 60/112,017, Mar. 25, 1997, abandoned.

[51] Int. Cl.[7] .................................................. B29D 11/00
[52] U.S. Cl. ........................ 264/1.36; 264/1.1; 264/2.6; 264/496; 264/39
[58] Field of Search ....................... 264/1.1, 2.6, 1.36, 264/1.38, 2.5, 494, 496, 39, 334; 425/808

[56] References Cited

U.S. PATENT DOCUMENTS

| | | | |
|---|---|---|---|
| 3,871,803 | 3/1975 | Beattie . | |
| 4,121,896 | 10/1978 | Shepherd | 264/2.5 |
| 5,080,839 | 1/1992 | Kindt-Larsen | 264/2.6 |
| 5,094,609 | 3/1992 | Kindt-Larsen | 264/2.6 |
| 5,394,988 | 3/1995 | Edwards et al. | 205/5.1 |
| 5,461,570 | 10/1995 | Wang et al. | 364/468 |
| 5,467,868 | 11/1995 | Abrams et al. | 206/5.1 |
| 5,508,317 | 4/1996 | Mueller | 522/85 |
| 5,551,663 | 9/1996 | Bae et al. | 249/114.1 |
| 5,574,554 | 11/1996 | Su et al. . | |
| 5,583,163 | 12/1996 | Mueller | 522/152 |
| 5,674,557 | 10/1997 | Widman et al. | 264/1.1 |
| 5,782,460 | 7/1998 | Kretzschmar et al. | 264/1.38 |
| 5,894,002 | 4/1999 | Boneberger et al. | 264/1.38 |

FOREIGN PATENT DOCUMENTS

| | | |
|---|---|---|
| 0183324A2 | 11/1985 | European Pat. Off. . |
| 0645235A2 | 6/1991 | European Pat. Off. . |
| 0604178A1 | 12/1993 | European Pat. Off. . |
| 0604179A2 | 12/1993 | European Pat. Off. . |
| 0607692A2 | 12/1993 | European Pat. Off. . |
| 0637490A1 | 7/1994 | European Pat. Off. . |
| 0671249A1 | 2/1995 | European Pat. Off. . |
| 0685734A1 | 5/1995 | European Pat. Off. . |
| 0686459A2 | 6/1995 | European Pat. Off. . |
| 0686558A2 | 6/1995 | European Pat. Off. . |
| 0686585A2 | 6/1995 | European Pat. Off. . |
| 0686841A2 | 6/1995 | European Pat. Off. . |
| 0686898A2 | 6/1995 | European Pat. Off. . |
| 0686899A2 | 6/1995 | European Pat. Off. . |
| 0686901A2 | 6/1995 | European Pat. Off. . |
| 0687550A2 | 6/1995 | European Pat. Off. . |
| 1128971 | 9/1956 | France . |

*Primary Examiner*—Mathieu D. Vargot
*Attorney, Agent, or Firm*—R. Scott Meece; Robert J. Gorman, Jr.

[57] ABSTRACT

Efficient and consistent processes for manufacturing moldings, especially ophthalmic lenses such as contact lenses. The processes comprises a series of improvements, including improvements in the areas of conditions for dispensing liquid prepolymer into lens molds, male and female mold mating, reusable molds, mold cleaning, lens separation from molds (demolding), lens handling, and in-line inspection. Cyclic series of processing steps are also disclosed. Additionally, an improved molding tool is disclosed, with the molding tool including a male mold housing and a female mold housing, each of which have disposed therein a plurality of mold halves.

46 Claims, 8 Drawing Sheets

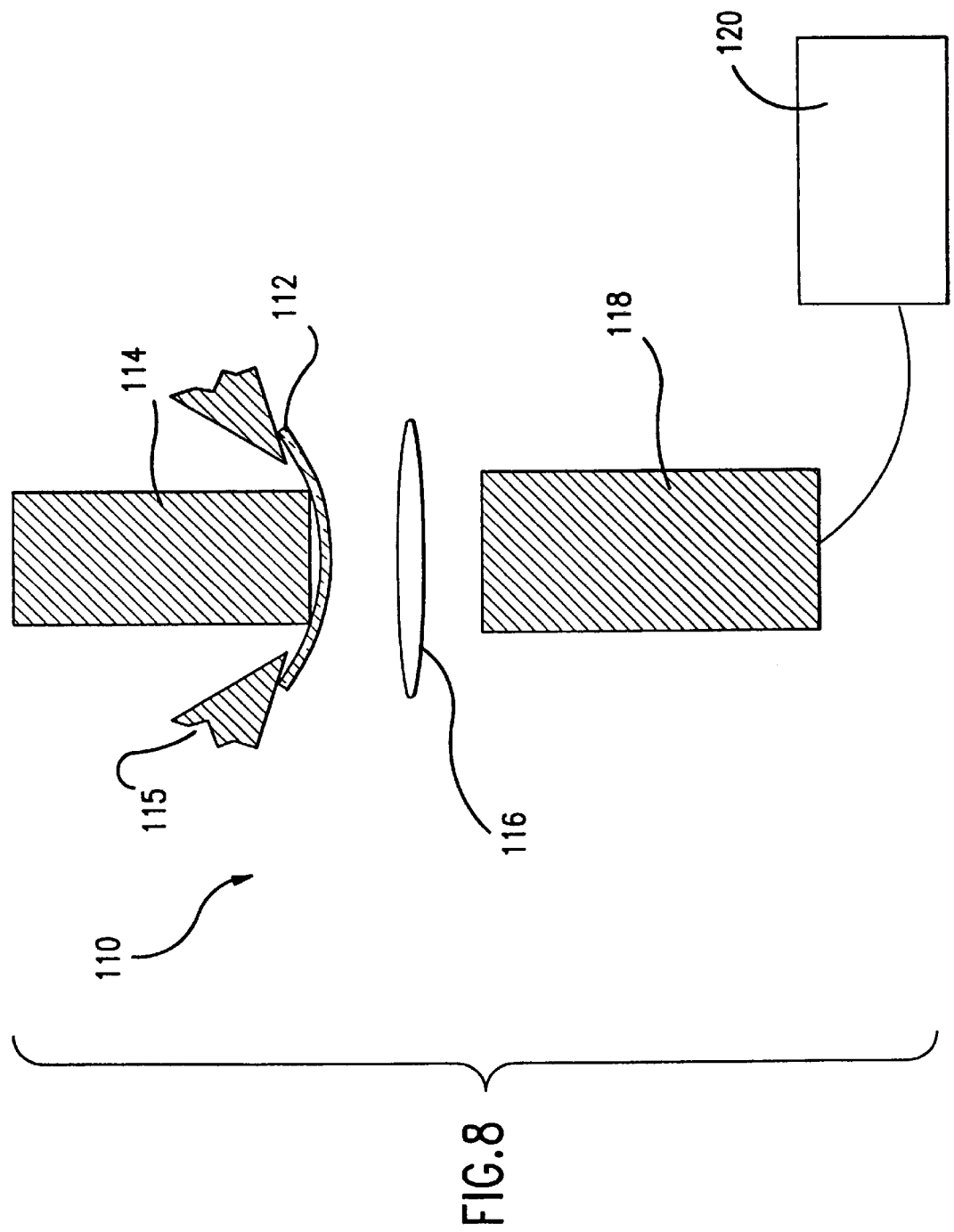

MOLDING PROCESSES

This application claims the benefit of U.S. Provisional No. 60/112,017 filed Mar. 25, 1997, abandoned.

BACKGROUND OF THE INVENTION

1. Field of the Invention

The invention relates broadly to molding technology. More specifically, this invention relates to ophthalmic lens molding processes. In a preferred embodiment, the invention relates to contact lens molding processes.

2. Description of the Related Art

The formation of articles by dispensing a polymerizable and/or crosslinkable liquid material into a mold has been used in a wide variety of technological areas. Of particular interest is the molding of medical devices, such as ophthalmic lenses. One type of ophthalmic lens which is widely used for vision correction is the contact lens.

Contact lenses are manufactured by a number of processes. One traditional approach of lens manufacture is to form a lens blank by polymerization of liquid monomers in a lens blank mold, then mechanically lathe the lens blank into a finished contact lens. Typically these lathed lenses are subjected to a subsequent polishing step to remove imperfections generated during the lathing process. More recently, double-sided molding (DSM) processes have been developed. These processes typically involve dispensing of a liquid monomer into a female mold half, mating a male mold half to the female, and then applying ultraviolet radiation to polymerize the monomers. The polymerized lens removed from the molds in a DSM process does not usually require surface polishing, but subsequent extraction of unreacted monomer or solvent is commonly required.

U.S. Pat. No. 5,508,317, issued to Beat Müller on Apr. 16, 1996, discloses remarkable improvements in the chemistry of the polymerizable material for molding ophthalmic lenses by providing a method of molding contact lenses without the need to remove unreacted monomer or solvent. This patent disclosed a water soluble prepolymer composition which can be dispensed into lens molds and crosslinked to form a finished optical-quality contact lens in a matter of seconds, without the necessity for subsequent extraction steps. The improved chemistry taught by this patent enabled substantial cost reductions in contact lens manufacture, thereby reducing costs sufficiently to make daily disposable contact lenses a reality for consumers.

European Patent Application No. 637,490, published on Feb. 8, 1995, discloses some outstanding methods of molding the prepolymer materials of U.S. Pat. No. 5,508,317. One embodiment of the invention involves introducing crosslinkable material into a two-part mold, wherein the mold halves are held a small distance from one another so that a thin annular gap is formed between them. The gap is in fluid communication with the mold cavity, so excess prepolymer may escape through the gap. Crosslinking of the prepolymer occurs by application of radiation, e.g., UV light, with the impingement of the radiation being restricted to the mold cavity by masking, i.e. blocking light impingement, in the areas outside the mold cavity. The molding teachings of U.S. application Ser. No. 08/274,942, Hagmann, et al., is incorporated herein by reference.

However, improvements in the efficiency of molding processes are always desirable. Thus, there is a need for molding production process improvements which reduce product cycle time, increase finished product quality, improve product consistency, and reduce the consumption of processing materials. In addition, reductions in environment impact are always desirable, e.g. by reducing the number of molds which must be recycled and/or trashed.

SUMMARY OF THE INVENTION

An object of the invention is to improve the efficiency of molding processes, especially contact lens molding processes.

Another object of the invention is to increase the consistency and quality of molding processes, especially contact lens molding processes.

A further object of the invention is to reduce the quantity of materials consumed in molding processes, especially contact lens molding processes.

Yet another object of the invention is to reduce the environmental impact of molding processes, especially contact lens molding processes.

These objects and other advantages are achieved by the various embodiments of the invention described in detail herein.

One embodiment of the invention is a process for the semi-continuous production of ophthalmic lenses which includes a cyclic portion in which the mold halves are continuously reused for a number of cycles.

Another embodiment of the invention is a process for producing a plurality of moldings, a portion of which is cyclic, which includes the steps of (a) dispensing crosslinkable and/or polymerizable material into a female mold half, (b) mating a male mold half to a female mold half; (c) applying radiation to crosslink and/or polymerize the crosslinkable and/or polymerizable material to form a molding; (d) separating the male mold half from the female mold half; (e) washing the mold halves and molding to remove unreacted crosslinkable and/or polymerizable material; (f) ensuring the molding is adjacent a selected mold half (e.g., the female mold half); (g) centering the molding within the selected mold half; (h) grasping the moldings (e.g., in a central area) to remove the moldings from the mold half; (i) at least partially drying the molding to remove surface water which may impair inspection of the molding; (j) inspecting the molding; (k) depositing an acceptable molding into packaging; (l) cleaning the male and female mold halves; and (m) indexing the male and female mold halves to a position for dispensing crosslinkable and/or polymerizable material.

Yet another embodiment of the invention is a process of dispensing crosslinkable material into a mold half, in which the dispensing is conducted (a) in an atmosphere having a relative humidity of at least 55% (preferably about 60% to about 80%); (b) at a height of about 0.1 mm to about 5 mm from a surface of a mold half (preferably about 1 to 3 mm and more preferably about 1.5 to 2.5 mm); and (c) at a horizontal distance of about 1 to about 6 mm (preferably about 4 to 6 mm) from the central axis of symmetry of the mold half.

Still another embodiment of the invention is a process of mating a male mold half and a female mold half in a two step motion, which includes (1) angularly articulating one mold half toward the other mold half over a angle of about 90° to about 270° (preferably about 180°) followed by (2) moving the one mold half toward the other (or moving both mold halves toward each other) in a substantially linear motion while the mold surfaces are substantially parallel to one another.

A further embodiment of the invention is a molding assembly housing a plurality of male and female mold halves. The molding assembly housing includes (a) a male molding assembly housing a plurality of male mold halves removably affixed thereto; and (b) a female molding assembly housing a plurality of female mold halves removably affixed thereto. The assemblies are affixed to one another such that the male assembly may be pivoted to a position in which the male and female mold halves are essentially parallel to one another, and then may be moved in a linear direction in order to mate.

Yet a further embodiment is a process for inspecting peripheral areas of an ophthalmic lens which is grasped in a central area of the lens and stabilized, preferably both centrally and peripherally. The peripheral inspection process includes the steps of (a) grasping and stabilizing an ophthalmic lens in a central region; (b) illuminating a peripheral region of the ophthalmic lens; (c) forming an image of the peripheral region of the ophthalmic lens with a camera means; and (d) evaluating the image in order to determine whether to reject a lens and/or adjust process parameters.

Still a further embodiment of the invention is a process of producing a finished ophthalmic lens product from crosslinkable and/or polymerizable material which is completed in less than about 20 minutes.

BRIEF DESCRIPTION OF THE DRAWINGS

FIG. 8 shows a sectional view of an inspection process for inspecting the periphery of an ophthalmic lens.

OUTLINE OF THE DESCRIPTION

Figure 1:
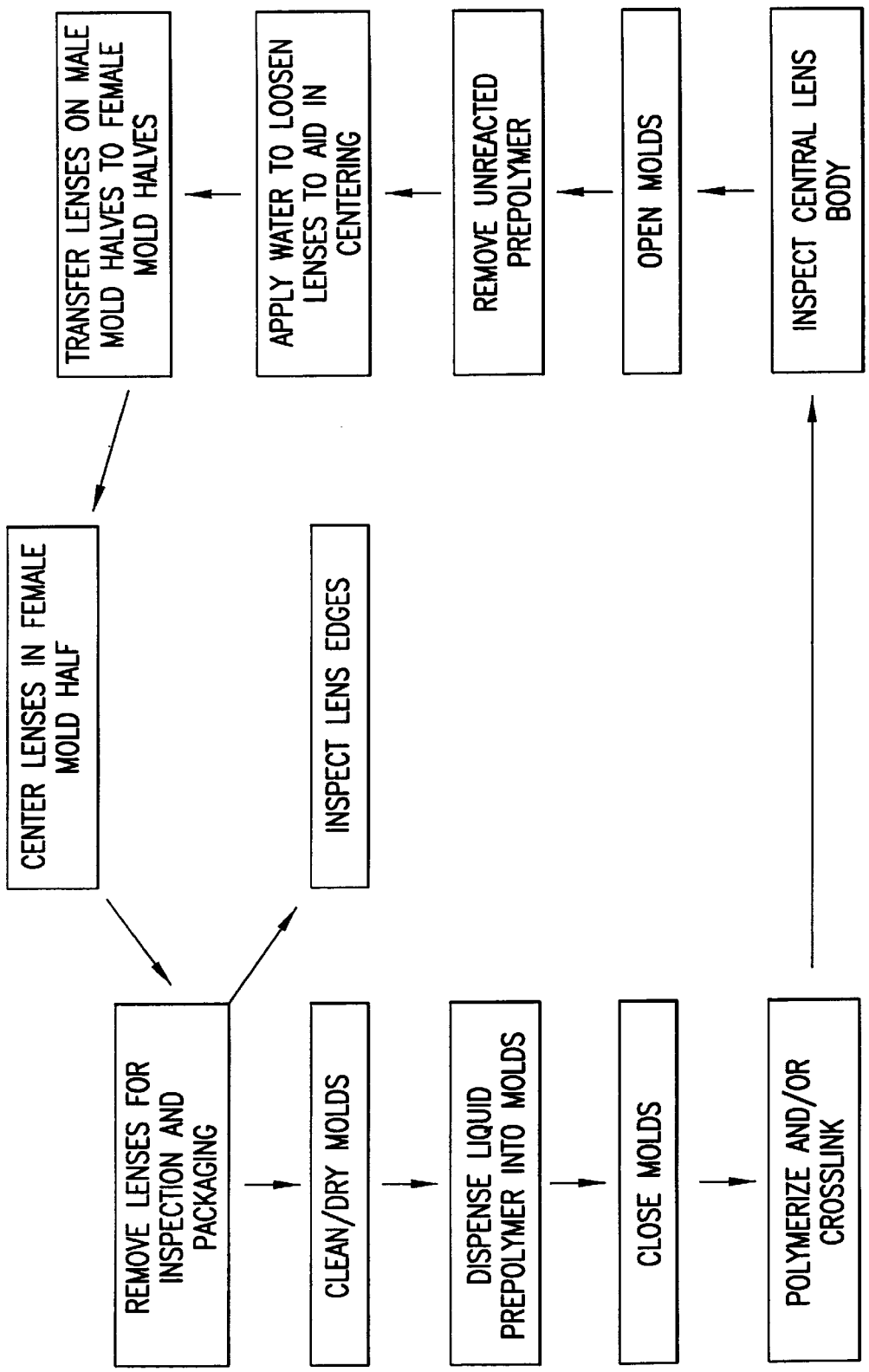
FIG. 1 is schematic illustration of a process flow arrangement in accordance with one embodiment of the invention.

A. MOLDING PROCESSES
1. Molding Tool
2. Prepolymer Dispensing
3. Mold Closing
4. Initiating Crosslinking And/Or Polymerization
5. Interior Lens Body Inspecting
6. Mold Opening
7. Mold Half Cleaning
8. Wetting of the Female
9. Transferring Lens from the Male to the Female Mold
10. Optional Resting Position
11. Lens Centering
12. Lens Removal and Water Droplet Removal
13. Lens Edge Inspecting
14. Lens Transfer To Packaging and Scrap Disposal
15. Saline Dispensing and Package Sealing
16. Mold Cleaning And Drying
17. Cyclic Series of Process Steps
B. PREFERRED PREPOLYMER MATERIALS

DESCRIPTION OF THE PREFERRED EMBODIMENTS

One embodiment of the invention is a process for the continuous production of ophthalmic lenses in which a portion is cyclic and in which the mold half or halves are reused, i.e., recycled into the process for a number of cycles. The various embodiments of the invention are described with respect to the preferred ophthalmic lens embodiment, however, various embodiments of the invention are not limited to a specific type of molding. "Ophthalmic lenses", as used herein, refers to any medical or vision correction devices which are used in the ocular environment, including contact lenses, intraocular lenses, corneal onlays and inlays, ocular drug delivery devices, ocular wound healing devices, and the like.

The cyclic portion of the lens production process generally involves dispensing a liquid crosslinkable and/or polymerizable material into a female mold half, mating a male mold half to the female mold half, irradiating to crosslink and/or polymerize, separating the mold halves and removing the lens, cleaning the mold halves and indexing the mold halves to the dispensing position.

The process may utilize a variety of polymerizable and/or crosslinkable materials. However, it is preferred that the polymerizable and/or crosslinkable materials may be polymerized and/or crosslinked in a short time, i.e., within the cycle time of one or two steps of the process, e.g., in less than a minute, more preferably in less than 30 seconds, and even more preferably in less than 10 seconds. A preferred class of crosslinkable and/or polymerizable materials is described more fully herein below. For convenience, the terms "prepolymer" and "polymer precursor" will be used herein interchangeably to describe crosslinkable and/or polymerizable materials.

The semi-continuous, partially cyclic molding processes of the present invention take advantage of the reuse or recycling of the mold halves used to retain the liquid prepolymer material and give the moldings their shape. In one embodiment, the mold halves are used at least 1000 times, i.e., each pair of mold halves produces at least 1000 moldings before being discarded or refurbished. Preferably, the mold halves are reused at least 10,000 times, more preferably at least 100,000 times, and even more preferably, the mold halves are reused at least 1,000,000 times.

Reuse of the molds, or at least one mold half, offers a number of advantages over the prior art processes, in which plastic molds are discarded after one use. One advantage of mold half reuse is that the amount of mold halves which are discarded or recycled is remarkably reduced. This can reduce molding manufacturing costs, which reduces the price charged to the customer for the molding. Also, employing reusable mold halves instead of employing single-use mold halves reduces the ultimate scrap imposed upon the environment, which must always be a goal of manufacturing operations. Furthermore, single-use mold halves offer more chances for molding inconsistency merely because of each molding requires two new mold halves, each of which may contain one or more defects. Yet another advantage is that reusable mold halves eliminate the need for mechanisms which will feed, orient and store the multitude of single-use mold halves required for such a production process. Each of these mechanisms is costly in itself, and each mechanism may independently fail, thereby reducing overall process throughput. Still another advantage of reusable mold halves is that extremely high quality mold halves may be used, and higher mold quality generally translates into higher quality finished lens products. Even another advantage is that the use of the same mold halves repeatedly ensures the consistency and reproducibility of the molded product. Thus, the advantages of reusable moldings in a semi-continuous, partially cyclic process are numerous.

It should be noted that the innovative cyclic portion of the lens production process does not require reuse of both mold halves, although this is one preferred embodiment. For example, repeated use of a series of male mold halves in conjunction with disposable female mold halves offers certain advantages. One advantage of such reusable/disposable mold process is that the female mold halves may be adapted for use as both a female surface molding instrument and for use as a portion of the final lens package. In this embodiment, a portion of the lens packaging process may be eliminated, namely, the portion related to production of contact lens-retaining packages.

Further innovative aspects of the molding processes will be described more thoroughly with respect to a preferred embodiment of the overall process described herein below.

A. MOLDING PROCESSES

One preferred embodiment of the invention, shown schematically in FIG. 1, is a process for the manufacture of a molding, especially a contact lens, which includes the following steps:

(a) dispensing liquid prepolymer into a mold half or halves, preferably a plurality of female mold halves;

(b) closing the mold(s), e.g., by mating the male mold half with the female mold half (or plurality thereof);

(c) crosslinking and/or polymerizing the prepolymer material to form a solid molding;

(d) inspecting the central region of the molding(s);

(e) opening the mold(s), e.g., by separating the male mold half from the female mold half;

(f) removing unreacted prepolymer from the mold(s) and molding(s);

(g) applying water to the female mold half to facilitate centering the molding(s), which may already be located on the female mold halves or may subsequently be transferred from the male mold half;

(h) transferring any molding(s) on the male mold half or halves to the female mold half or halves (or vice versa);

(i) centering the molding(s) on the mold half or halves (optionally passively accomplished);

(j) removing the molding(s) for packaging;

(k) inspecting the periphery of the molding(s);

(l) cleaning the mold(s); and (m) indexing the mold(s) to a position for prepolymer dispensing.

It should be noted at the outset that the ordering of some of the steps is not highly critical. For example, although dispensing prepolymer, closing molds and crosslinking must occur in a sequential order, the inspection steps may occur in a variety of locations throughout the process. In addition, some of the steps are optional in the broader aspects of the invention, such as inspecting, centering or transferring. Furthermore, some of the steps or stages of the process, such as the peripheral and body inspection stages, may be combined into one stage.

The cycle times for the steps may vary, depending on a number of factors, such as the specific polymeric composition and the dimensions of the molding. Clearly, it is preferred to minimize cycle times in order to maximize production rates. Preferably, individual cycle times are less than about one minute each, more preferably less than about 30 seconds, even more preferably less than about 10 seconds, and most preferably less than about 6 seconds. In a preferred embodiment, a final molded product can be formed from the initial prepolymer material, inspected and separated from the mold in a period of less than about 20 minutes, more preferably in less than about 10 minutes, even more preferably in less than about 2 minutes, and most preferably in less than about 1 minute.

The molds used to form the ophthalmic lenses are preferably double-sided molds, i.e., the complete mold includes a male (convex or base curve) mold half and a female (concave or front curve) mold half. However, various embodiments of the invention may be utilized with other types of molds.

1. Molding Tool

Figure 2A:
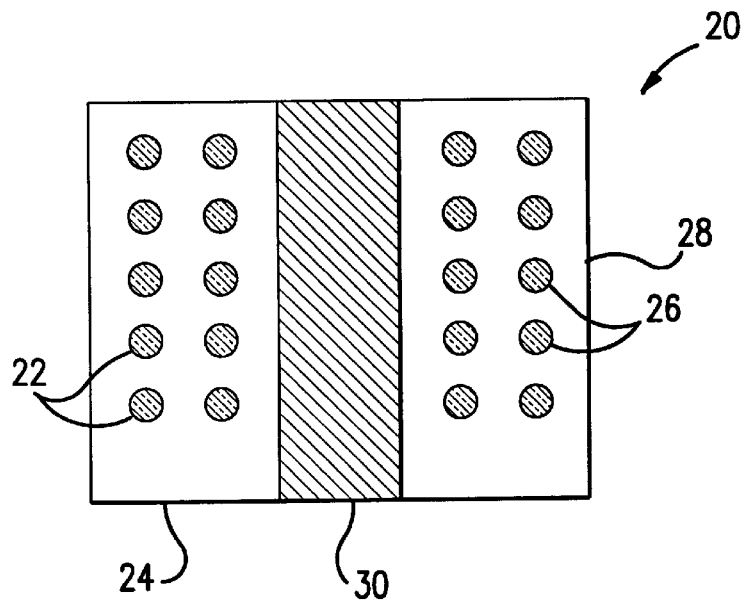
FIG. 2A illustrates a plan view of one embodiment of a molding tool in open position.

The semi-continuous, partially cyclic molding process may be operated with a single mold cycling through the process. However, in a preferred embodiment, the process utilizes a plurality of molds arranged and aligned in a molding tool, in order to improve process efficiency. For example, FIG. 2A illustrates a plan view of one embodiment of a molding tool 20 having an array of ten complete molds. Molding tool 20 includes an array of ten female mold halves 22 removably positioned in a first housing 24. Molding tool 20 further includes an array of ten male mold halves 26 removably positioned in a second housing 28. First housing 24 is affixed to second housing 28 by a pivoting means 30, which allows second housing 28 to articulate towards first housing 24 in order to releasably mate the male and female mold halves. Thus, first housing 24 is hingedly affixed to second housing 28.

Figure 2B:
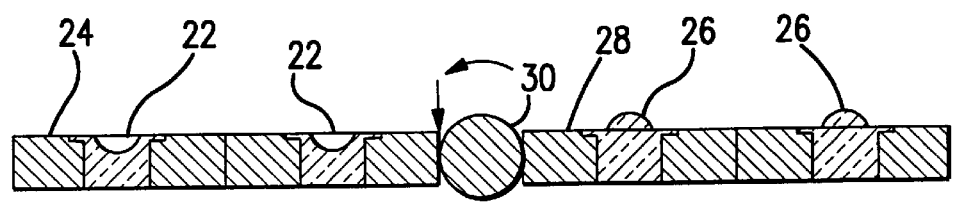
FIG. 2B shows an end sectional view of the FIG. 2A molding tool embodiment in open position.
Figure 2C:
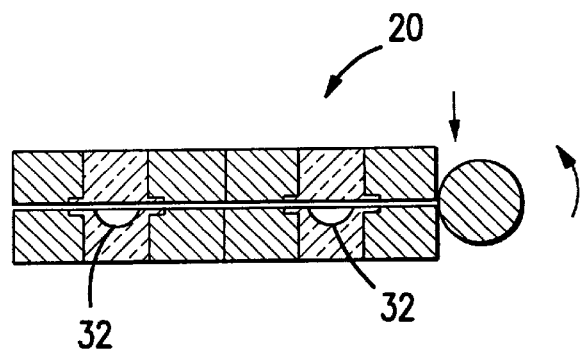
FIG. 2C shows an end sectional view of the FIG. 2A molding tool embodiment in closed position.

In operation, liquid prepolymer (or a solution or dispersion thereof) is dispensed into female mold halves 22. Male mold halves 26 are mated with female mold halves 22 by rotating and linearly moving second housing 28, as showing by the arrow in FIG. 2B. Molding tool 20 is shown in a closed position (i.e., molding position) in FIG. 2C. In FIG. 2C, all ten pairs of mold halves are mated, thereby defining ten molding cavities 32 in which a lens may be formed.

The mold halves may be formed from a number of materials, at least one of which transmits the desired radiation for crosslinking and/or polymerization, preferably in the ultraviolet range. One preferred material which may be used for reusable molds is quartz. The reusable mold half is preferably the male mold half. Preferably only one mold half transmits sufficient radiation while the other does not. Quartz offers substantial advantages in durability, thereby allowing the molds to be reused a remarkable number of times without affecting product quality. However, quartz molds are quite expensive. Alternatively, the mold halves may be molded from a polymeric material, at least one of which transmits the desired radiation. Examples of suitable mold materials include polystyrene, polypropylene and poly (acrylonitriles) such as BAREX.

In a preferred embodiment, the mold halves of at least one of the set of male mold halves or the set of female mold halves includes a peripheral region which blocks light (especially UV light) during polymerizing and/or crosslinking. Use of such a light blocking periphery enables a precise definition of the edge of the lenses which are formed. This region may be produced by depositing a metallic coating in the region outside the lens forming surfaces of the mold halves.

2. Prepolymer Dispensing

During the dispensing stage, prepolymer (e.g., crosslinkable poly(vinyl alcohol) polymer precursor solution) is dispensed into a plurality of female molds, which may be arranged in rows (e.g. two rows of five each as shown in FIG. 2A). Prepolymer dispensing conditions may have significant impact on final molded lens quality. Thus, dispensing conditions of humidity, height from the dispensing tip to the bottom of the female mold surface, and distance from the dispensing tip to the side of the female mold surface are controlled to minimize defects.

Figure 3:
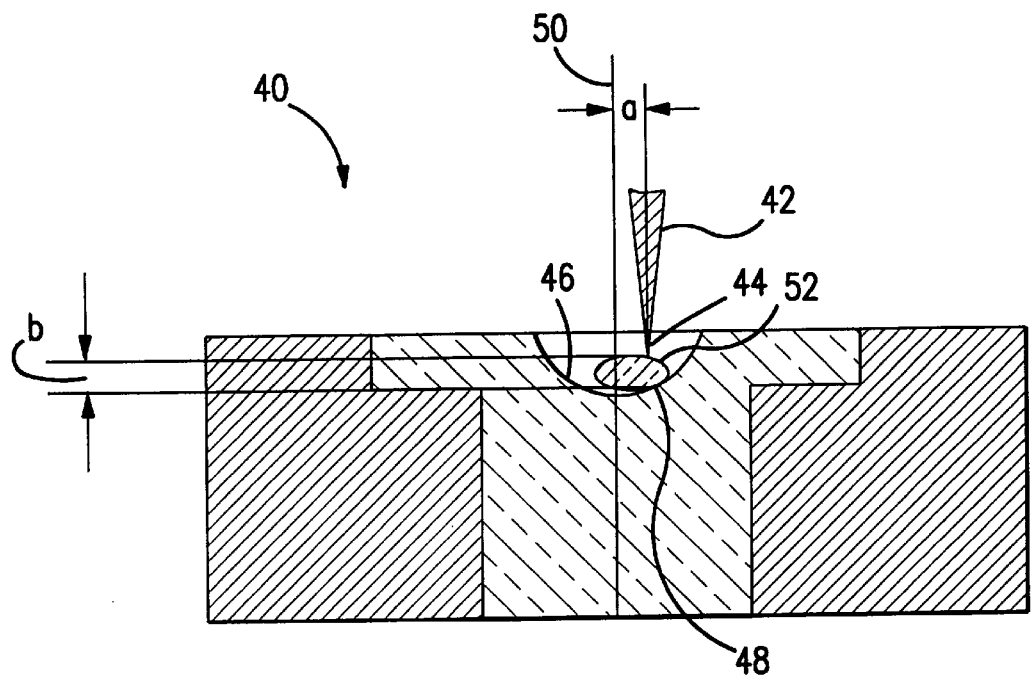
FIG. 3 depicts one embodiment of the arrangement for dispensing prepolymer into a lens mold half.

FIG. 3 shows a preferred prepolymer dispensing arrangement 40. Dispensing means 42 (e.g., a syringe or dosing needle) includes a tip portion 44 through which prepolymer passes to fill female mold half 46. Tip portion 44 is positioned above female mold half 46 a distance "b" from bottom surface 48 and a distance "a" from central axis 50 of the mold. The dispensing tip is preferably (1) within a certain distance "a" from the center axis of the mold (off axis) and (2) within about 1–3 mm from the female mold half. Preferably, dispensing means 42 is in contact with the dispensed liquid contained in the female mold after completion of dispensing (i.e., touching the prepolymer surface) to avoid detrimental bubbles.

Air bubbles, depending on their location, may cause defects in the final lens product. The defects may impair structural integrity, thereby resulting in tears, or, more commonly, the defects may cause optical imperfections which impair the consumer's vision. It is important to note that bubbles are frequently formed, but if the bubble is located near enough to the edge it may be removed (i.e., "squeezed out") during the step of mating the male mold half to the female mold half. Moreover, it is preferred to overdose or overfill the female mold half in order to minimize defects, especially those related to edge problems.

In a preferred embodiment, distance "a" from mold central axis 50 is about 3 to about 7 mm. More preferably, distance "a" is about 5 to about 6 mm.

In a preferred embodiment, distance "b" from dispensing tip portion 44 to mold bottom surface 48 is about 0.1 to about 4 mm. More preferably, distance "b" is about 1 to about 3 mm, while even more preferably the distance is about 1.5 to about 2.5 mm. Maintaining distance "b" this small prevents the droplets or liquid stream from being dispensed at a height sufficient to generate bubbles which may result in defects.

High humidity is preferred during the dispensing step in order to prevent the formation of a surface film or "skin" and/or the generation of bubbles during the filling process. The relatively high humidity inhibits drying and dehydration of the prepolymer solution at the dispensing tip. Preferably, the relative humidity surrounding the prepolymer during dispensing is about 55% or greater. More preferably, about 60 to about 80 percent relative humidity is maintained during dispensing. Furthermore, high humidity helps to avoid Schlieren optics defects in the lenses.

Another factor relating to the prepolymer solution dispensing step which should be selected with care is the diameter of the dispensing tip. A diameter which is too small or too large may cause bubbles to be generated. A preferred dispensing tip diameter is about 0.5 mm to about 4.0 mm, more preferably about 0.5 mm to about 2.0 mm and even more preferably about 1 to about 1.5 mm.

A "skin" may form on the surface if too much time elapses before molding, especially if humidity is low, due to dehydration. Accordingly, the time from final dispensing of prepolymer to the closing of the molds should be minimized. Preferably, the time from dispensing to mold closing is less than about 30 seconds, more preferably less than about 15 seconds, and even more preferably less than about 8 seconds.

3. Mold Closing

The molding assembly is closed preferably immediately subsequent to the prepolymer dispensing stage. The male mold housing is preferably attached by a pivot means or hinge means to the female mold housing. Closing of the molds is preferably accomplished in a two step motion, which includes (1) angularly articulating one mold housing toward the other mold housing followed by (2) moving one mold housing toward the other (or moving both mold housings toward each other) in a substantially linear motion while the mold surfaces are substantially parallel to one another. Thus, in one embodiment, closing of the molds is effectuated by first rotating or pivoting the male mold housing (and removably affixed array of male mold halves) about the hinge means to a mating position with the corresponding female mold housing (and removable affixed array of female mold halves). The angle of rotation depends on the desired resting position of the male mold housing relative to the female mold housing prior to the mold closing stage. Preferably the angle of rotation is about 90 to about 270 degrees (preferably about 150° to 210°, more preferably about 170° to 190°).

The first movement, i.e., the angular articulation, preferably occurs at a relatively fast rate, while the second movement, i.e., the linear motion, occurs relatively slowly. The angular articulation preferably occurs in less than a second (e.g., a rate of about 100–500°/second, more preferably about 200–300°/sec.). The linear movement may occur at a rate which does not cause substantial defects or process downtime, e.g., a rate of about 0.1 to 2 mm/second, and preferably about 0.5 to 1 mm/sec. It is preferable to minimize the linear motion so that the speed of the overall process is maximized. Thus, the linear distance preferably occurs over a distance of less than 6 mm, more preferably about 1 to 3 mm.

While it is generally preferred to minimize the time required to close the molds, excessive mold half mating speeds may cause defects. Excessive mating speeds may cause bubbles to form or may inhibit the escape of bubbles already present in the prepolymer solution.

Yet, this angular articulation speed is somewhat dependent upon the location of the mold halves relative to the hinge means which affixes the male and female mold housings to one another. Typically all of the mold halves are positioned less than about 25 centimeters from the hinge means. In this case, the angular articulation speeds described above are typically acceptable. It should be noted that a salient characteristic to consider in setting the angular articulation speed is the production of a high quality product. Accordingly, while the angular articulation speeds stated herein are good guides, the angular articulation speed used in a particular tooling arrangement should be chosen to minimize lens defects, and secondly, to maximize production volumes.

As mentioned earlier, it is desirable to minimize the time required for mold closing, as it is desirable to minimize processing times in any steps of manufacturing. Accordingly, angular articulation speeds may be maximized in regions in which lens defects will not be generated by high articulation speeds. In one preferred embodiment, a mechanical mechanism is used in the final closing motion in order to ensure a reduced rotation speed.

Another aspect of the mold closing process which may affect the rate of defects formed in the lenses relates to whether all of the mold halves experience substantially the same mold closing conditions. It is highly preferable to close all of the molds substantially simultaneously and at substantially the same speed. If the molds are all closed at the same time, all of the finished products will have experienced the same time delay from mold closing to the polymerizing and/or crosslinking step. Uniformity of mold closing speeds and times improves product quality and consistency. Accordingly, it is highly preferred to bring the mold housings to a position in which the molding faces are substantially parallel with one another before effectuating the final linear movement.

4. Initiating Crosslinking and/or Polymerization

Subsequent to the mold closing step, polymerization and/or crosslinking is initiated, thereby transforming the liquid prepolymer into a solid form, with the form being determined by the mold halves. Preferably, the molding tool is indexed to another stage in which a form of radiation is impinged upon the molds, which allow substantially all of the radiation to transmit therethrough, and thereby contact the liquid prepolymer. Preferred wavelengths of radiation are in the ultraviolet (UV) range.

The irradiation period is preferably less than about 5 minutes, more preferably less than about a minute and even more preferably less than about 10 seconds. Preferably the irradiation is accomplished in one step or stage of the process, but this is not a requirement because more than one stage of the process may be used for irradiation. For example, if a uniform step duration of about 4 seconds is selected for the process, but an irradiation time of about 6 seconds is desired, two irradiation stages may be inserted into the process to provide adequate irradiation.

The required irradiation period is a function of the intensity of applied radiation, the chosen prepolymer, and the particular photoinitiator used. A preferred intensity of ultraviolet radiation for poly(vinyl alcohol) prepolymers is about 1–5 milliwatts per square centimeter, more preferably about 2 to about 3.5 mW/cm$^2$, and even more preferably about 2.8 to 3.2 mW/cm$^2$. A preferred wavelength of applied radiation is about 280 to about 380 nanometers, more preferably about 305 to about 350 nm. The peak wavelength of the radiation source is preferably not within the applied wavelength range, in order to avoid forming brittle lenses. Use of a filter to achieve the desired applied wavelength range is preferred to avoid this lens brittleness problem.

One preferred method of applying radiation involves utilizing a means for masking radiation in areas outside the lens forming cavity, thereby defining the edge of the lens with the masking means. Advantages of this embodiment are that the edge contour may be accurately and precisely controlled, edge defects are minimized, and subsequent edge processing is not required. In addition, the molds are preferably held a certain distance apart from one another, so that a thin annular gap is formed along the periphery which allows a pathway for excess prepolymer to escape. U.S. patent application No. 08/274,942 (Hagmann, et al.) teaches some preferred mold half arrangements and designs as well as preferred methods of radiation application, and the teachings therein are hereby incorporated by reference.

5. Interior Lens Body Inspecting

Subsequent to polymerization and/or crosslinking, the lens product may be automatically inspected at any of a number of stages in the molding and/or packaging processes. While it is preferred to inspect the entire lens in one stage, it is not always practical because, inter alia, one-stage inspection methods suffer from image interference by the lens supporting means. Also, although there are stages in which the entire lens may be inspected without substantial support interference, the stage may be sufficiently early in the process that another inspection is required before packaging. Thus, in a preferred embodiment, a central area of the lens is inspected in one stage, while the periphery or edge of the lens is inspected subsequently, or vice versa. In a more preferred embodiment, shown in FIG. 1, the body of the lens is inspected in a stage immediately subsequent to the irradiation stage.

Figure 4:
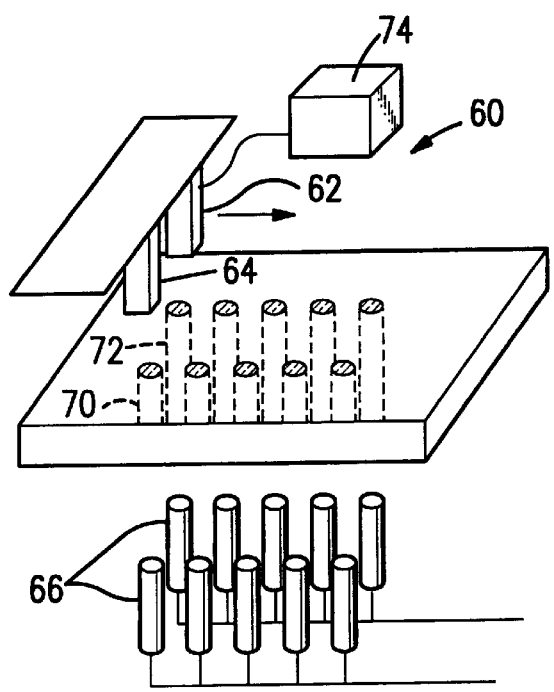
FIG. 4 shows one embodiment of the central lens body inspection step of the invention.

A preferred method of inspecting the body of the lenses is to use an inspection camera and associated illumination source for each row of lenses in the molding tool. A preferred illumination technique is bright field illumination, in which defects appear dark while acceptable regions appear light. For example, FIG. 4 shows a perspective view of a lens body inspection system 60 which includes a pair of detectors 62 and 64 (e.g., cameras such as a CCD camera) positioned above the lenses. Ten stationary light sources 66 are positioned below the lenses. Each detector sequentially inspects five lenses in this embodiment.

In operation, light shines from the light sources 66 and simultaneously through molding cavities 70 and 72 and impinges upon detectors 62 and 64. Detectors 62 and 64 each generate a signal, e.g., a digital image of the lens, which is conveyed to computer 74. After inspection of the first two lenses is accomplished, detectors 62 and 64 index forward (shown by arrow in FIG. 4) to inspect the next two lenses. Computer 74 compares the signals generated with one or more threshold signals or criteria in order to determine whether the lens is of acceptable quality. The lens is packaged or discarded in a subsequent stage or stages based on a signal relayed from the computer to a downstream controller.

6. Mold Opening

Figure 5A:
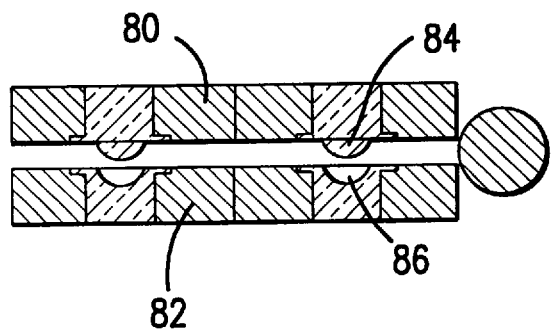
FIG. 5A shows an end sectional view of the initial linear movement of the male mold half in the mold opening step.
Figure 5B:
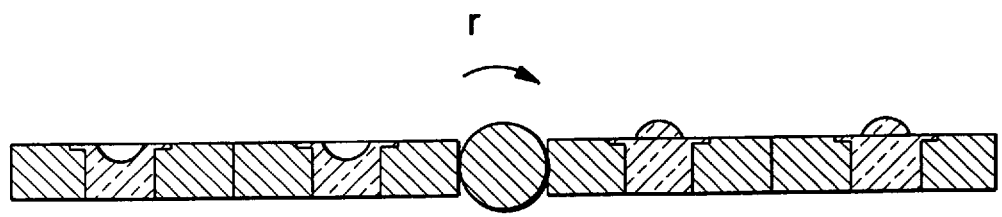
FIG. 5B shows an end sectional view of the final articulation of the male mold half in the mold opening step.

Subsequent to the polymerization and/or crosslinking step, and preferably subsequent to the central body inspection step, the molds are opened as shown in FIGS. 5A and 5B. Male mold housing 80 is preferably first moved linearly away and then articulated away from the female mold housing 82 in order to open the molds. The linear movement preferably occurs relatively slowly at first as shown in FIG. 5A, in order to separate male mold halves 84 from the female mold halves 86 with the lens resting on one of the mold halves. As shown in FIG. 5B, the slow linear movement during the step of separating the mold halves is followed by a relatively quick articulation of male mold housing 80 to a fully opened position over the remaining radius r (e.g., 180°) as shown in FIG. 5B.

The mold half separation step occurs at a relatively slow speed in order to minimize optical defects, e.g., Schlieren optics defects or streaking. Schlieren optics defects are essentially foldings in the lens. The Schlieren defects are believed to occur when the mold housing opening speed occurs at too quickly. The stretching or pulling of the lens only occurs when both molds are in contact with a corresponding surface of the lens, so the initial slowed rate of linear movement need only occur until at least one of the mold halves is separated from the lens. The articulation of the male mold housing may be accomplished by any number of means known in the art. For example, two or more electric motors may be used to articulate the male mold housing at two or more speeds. Alternatively, one electric motor with a variable speed controller may be used to control articulation rates. In a preferred embodiment, a mechanical mechanism (e.g., an electric motor) is actuated to slowly separate the molds and then an electronic motor and gear mechanism is actuated to articulate the male mold housing quickly after mold separation. Actuation of the articulation means may also occur by any number of means known in the art, i.e., electronic, mechanical, optical or any combination thereof. The control of the rates of articulation may be precisely controlled by a local programmable logic controller or by a central computer which controls movements of many or all process steps.

7. Mold Half Cleaning

Figure 6:
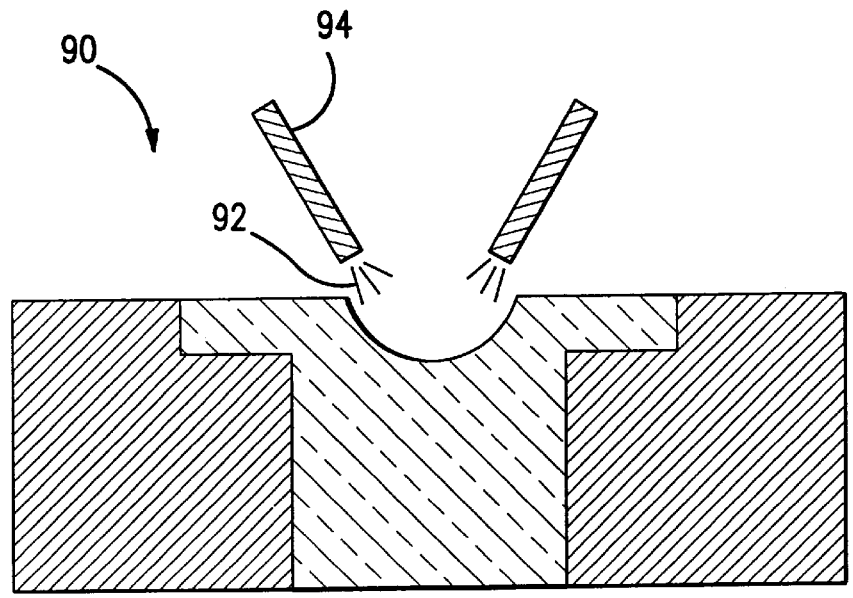
FIG. 6 shows a sectional view of one embodiment of the mold half cleaning step which occurs subsequent to molding.

Once the mold halves are separated, unreacted prepolymer may be removed by application of solvent, preferably water, to the mold surfaces and lenses. FIG. 6 illustrates a sectional view of a preferred post-molding cleaning arrangement 90. Water 92 is dispensed onto mold surfaces from a plurality of nozzles 94 positioned around the periphery of mold edges. A variety of water-dispensing nozzles, or a knife-edge type dispensing nozzle, could be employed to dispense water appropriately. The dispensed water and any unreacted prepolymer are removed by vacuum tube 96 positioned directly above mold surface.

Typically, the lens still adheres to the male mold half, so FIG. 6 does not depict a lens resting on the female mold half. However, at times, the lens may remain on the female mold half after separation of the mold halves.

In addition, application of air streams may be advantageous. For example, a plurality of air nozzles may be positioned around the periphery of the mold, preferably positioned between two water nozzles. Application of streams of air along with the water streams may help disperse the water across the mold. In addition, the lens may be held in one position better by appropriately adjusting the angle of impingement on the lens surface and flow rate of applied air.

Clearly, a number of cleaning arrangements may be envisioned which would be within the scope of the invention. For example, the vacuum tubing and water dispensing nozzles may be switched such that water is dispensed in the central area while an effluent vacuum is applied to the periphery of molding surface. Accordingly, the invention is not limited to the particular arrangement of post-molding cleaning components as disclosed in FIG. 6.

8. Wetting of the Female Mold Half

Subsequent to the cleaning step, a liquid, e.g., water or saline solution, is preferably applied to the female mold surfaces. While this step is optional, a drop or a few drops of water may be added to the mold halves in order to lubricate the lenses to enable the lenses to center themselves in the female mold halves.

Centration of the lenses in the female mold halves is desirable for actions which occur in subsequent steps. In particular, it is desirable to maintain the lens in a consistent location within the female mold half for one or more subsequent inspection steps. Furthermore, it is preferable to have the lenses located in a consistent location in the female mold halves in order to ensure that the location of the lenses on the removal arm, for inspection and/or transfer of the lenses to packaging, is consistent and predictable.

While the lenses are preferably molded from a material which does not require subsequent hydration, vacuum applied during the cleaning step may dehydrate the lenses to a certain extent. Accordingly, another advantage of adding water to the female mold half may be to avoid dehydration.

Therefore, centering the lens within the female mold half may be accomplished by dispensing a liquid to the lens in a first stage and indexing the lens to a second stage, thereby providing the lens with sufficient lubrication and time to center the lens within the female mold half. While the liquid may be dispensed to the center of the mold half, in one embodiment, the liquid is applied along the periphery of the female mold half to better ensure the entire surface is wetted. While the volume of liquid dispensed is not generally critical, about 0.01 to about 5.0 milliliters (preferably about 0.05 to 0.20 ml) is typically dispensed onto the female mold half.

It should be noted that the previous washing step may be combined with the centering step. In other words, application of an aqueous solution to wash the unreacted prepolymer off the lens and/or mold halves may simultaneously loosen the lens adhesion to the mold half. Thus, if washing and deblocking (i.e., lens-mold separation) are to be achieved in one step, the dispensing pressure, dispensing nozzle location and nozzle-to-lens angle should be selected in order to simultaneously remove unreacted prepolymer and effect lens-mold separation.

Furthermore, the lens may or may not be on the female mold half at this stage (i.e., after separation of the mold halves). Thus, the lens may be resting either on the male mold half or the female mold half. If the lens is not on the female mold half, which is typically the case, and the female mold half is substantially dry, it is still desirable to wet the female mold half. This wetting inhibits adhesion of the lens and promotes lens centering when the lens is subsequently transferred from the male mold half to the female mold half.

As mentioned previously, the mold masking methods of European Patent Application No. 637,490 (priority application of U.S. application Ser. No. 08/274,942) are a preferred molding method in accordance with the present invention. In a preferred embodiment of this method, areas outside the molding surfaces of the molds are prevented from impingement of radiation with a metallic mask (e.g. a chromium coating in the area of the non-molding surfaces). In order to prevent damage (e.g., dissolving) of such a metallic mask, preferably the applied water (both washing and centering liquid) has at least a conductivity of greater than about 100 microSiemens, more preferably greater than or equal to about 150 microSiemens.

10. Transferring Lens from the Male to the Female Mold

Before transferring lenses to packaging from the molds, the exact location of all the lenses should be known. Each lens may have adhered either to the male mold half or to the female mold half. Typically, the lens will adhere to the male mold half. Furthermore, one or more lens mold half surfaces may be treated, e.g., by plasma coating, to increase or decrease the adhesion force between the lens and the chosen mold half, thereby increasing the probability that a lens is located in the chosen mold half.

Figure 7A:
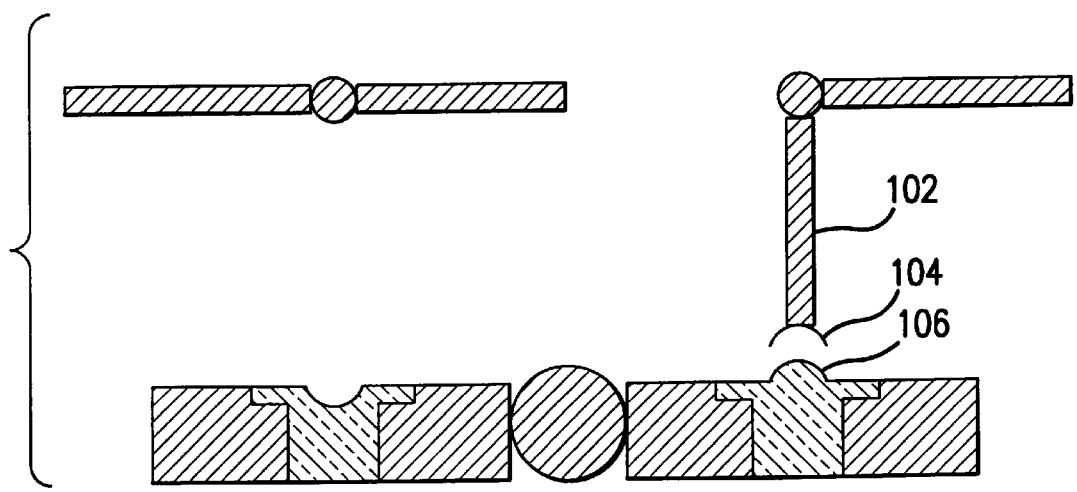
FIGS. 7A–C illustrate the movement of a lens from a male mold half to a female mold half in a side sectional view.
Figure 7B:
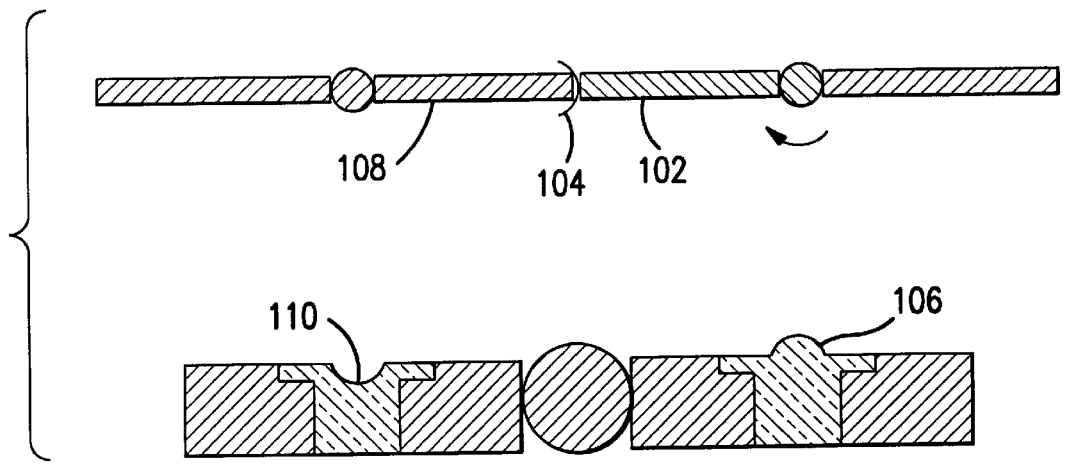
Figure 7C:
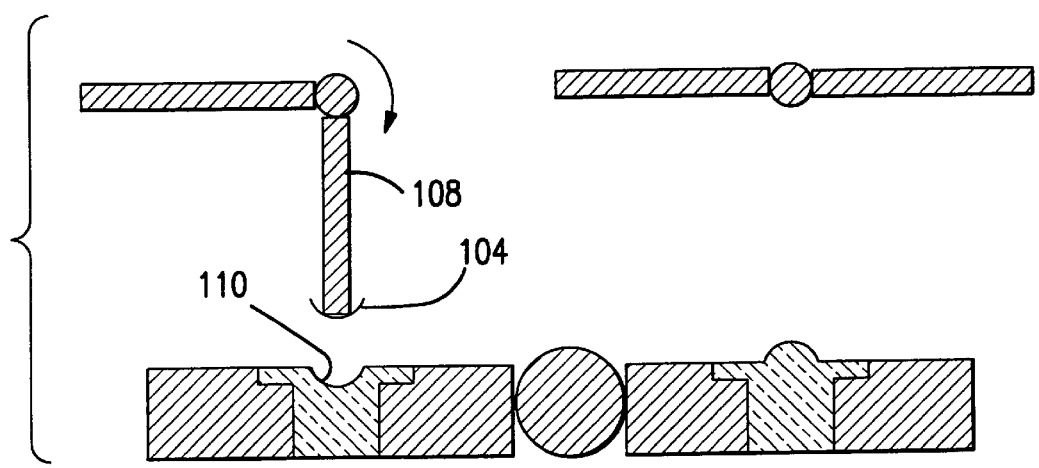

In order to ensure that all the lenses are located in the female mold half, a step of transferring lenses from male mold halves to female mold halves may be included in the process. FIGS. 7A–C illustrate side sectional views of a preferred automatic process for transferring any lenses on male mold halves to female mold halves. In FIG. 7A, robotic arm 102, which is positioned above male mold half 106, grasps lens 104 and removes lens 104 from male mold half 106 on which it rests. Robotic arm 102 is preferably equipped with a vacuum line and a valve which may be electronically controlled, in order to effectuate the grasping and subsequent releasing of the lens.

FIG. 7B shows the rotation of first robotic arm 102 to a position directly opposite second robotic arm 108. Lens 104 is transferred to second robotic arm 108, which is positioned generally above female mold half 110, when the vacuum valve is closed on first robotic arm 102 and nearly simultaneously opened on second robotic arm 108.

In FIG. 7C, second robotic arm 108 rotates downwardly, as shown by the arrow, to align lens 104 with female mold half 110. Once the lens and mold half are aligned, the vacuum valve is closed thereby allowing lens 104 to be released into female mold half 110.

Preferably, this step is performed on all male molds, regardless of whether lenses exist on the mold or not. In the vast majority of cases, the female mold half will not contain a lens. However, by uniformly applying the step to all male mold halves, the process ensures that all lenses are located in the female mold halves.

Clearly, a number of variations of the above-described transfer process may be envisioned. For example, it may be preferable to apply a positive pressure when releasing the lens, rather than merely discontinuing the vacuum. A positive pressure would ensure that the lens will not adhere to the robotic arm merely because of hydrostatic or other forces. A variety of other lens transfer systems are within the scope of the invention.

10. Optional Resting Position

After any step in the process, the tool may index into a resting position, in order to provide the process with a buffer of one or more tools. This arrangement may be advantageous for tooling change-overs, i.e., providing one or more positions in which the tools may be easily removed and replaced with tooling holding molds with a new optical power.

While one or more resting positions may theoretically be inserted between any two steps, certain positions may be more advantageous than others. For example, while insertion of a resting position immediately subsequent to the prepolymer dispensing step is within the scope of the invention, it would not generally be desirable. Subsequent to prepolymer dispensing it is preferred to immediately index to the crosslinking and/or polymerizing step, thereby avoiding any potential defects associated with delay (e.g., dehydration of the prepolymer).

11. Lens Centering

As mentioned previously, application of an aqueous solution, especially deionized water, is preferably applied to the female mold halves in order to lubricate the lenses and mold half surfaces, thereby promoting centration of the lenses in the female mold halves. This consistent centering of the lenses reduces problems associated with downstream inspection of the lenses and transfer of the lenses to packaging.

While application of an aqueous solution to the female mold surface lubricates the lens and mold surface of the female mold half, typically something more is required to promote centration of the lens in the female mold half. In particular, some motion of the female mold half and some delay time before further processing is preferred, subsequent to application of the aqueous solution, in order to allow gravitational forces to encourage the lens to center in the female mold half.

In a preferred embodiment, a centering station is provided in which no operations are performed on the lens and female mold half while the lens centers itself. The mere motion of the conveyor which moves the lens and female mold half to and from the centering station is typically sufficient to enable the lens to self-center within the female mold half. However, it may be preferable to apply some form of energy (e.g., a slight vibration or oscillation) to the female mold halves containing lenses during the centering stage. Regardless of the technique used, some means for ensuring the lenses are centered within the female mold halves is desirable.

12. Lens Removal and Water Droplet Removal

The lenses may be removed from the female mold halves for inspection and/or packaging, subsequent to the male-to-female transfer step (9), by any of a number of means known in the art. Robotic transfer arms, with a vacuum lines and controllable valves, analogous to those used in the lens transfer process, may be used to remove the lenses from the female mold halves.

Prior to inspection of the lenses, surface water droplets are preferably removed. Water droplets on the lenses may cause optical distortion which will cause the lens to inadvertently be selected for rejection during the edge inspection process. Accordingly, a mild air stream is preferably applied to the lenses while the lenses are being held by the robotic transfer arms.

However, the lens may be dehydrated by application of excessive amounts of air or by air whose humidity is too low. In plan view, the hydrated lens edge is circular. Unfortunately, even slight dehydration will cause the lens shape to change, thereby distorting the lens edge from circular in plan view and impairing automatic inspection of the lens edge. Therefore, preferably humid air is blown on the lenses to remove adhering water droplets without dehydrating the lens. The air humidity is preferably about 40% relative humidity or higher, more preferably about 60–80% relative humidity.

13. Lens Edge Inspecting

As mentioned previously, a preferred embodiment involves inspection of the lens periphery while the lens is held centrally by a robotic arm (e.g., by vacuum). FIG. 8 illustrates one preferred edge inspection system 110, in which a lens 112 is held by a robotic arm 114 while inspection occurs. Robotic arm 114 indexes downwardly to a position at which peripheral light source 116 is able to properly illuminate the edge of lens 112. Detector 118, e.g. a digital camera, is positioned below lens 112 and light source 116. An image or images generated by camera 118 is sent to computer 120 for a determination of whether the lens edge meets quality specifications.

In detail, a preferred method of peripheral inspection functions as follows. Light source 116 (e.g., a fiber optic ring light) is selected and positioned so that the edge of the lens is illuminated with light ray impinging at a glancing angle of incidence. Camera 118 views lens 112 through light source 116. The edge of the lens scatters some of the incident light into the camera aperture. Thus, the image appears light against a dark background. Two cameras are used to index 5 times for the 10 lenses.

During the inspection procedure, it is advantageous to maintain the lenses in a substantially stationary position. In a preferred embodiment, shown in FIG. 8 the lens is stabilized centrally by robotic arm 114. Furthermore, the periphery of the lens is stabilized in the FIG. 8 embodiment by stabilization arms 115.

The lens may be rejected immediately subsequent to inspection, e.g., by releasing the vacuum on the robotic arm and allowing the lens to fall into a disposal bin. Alternatively, defect lenses may be rejected at a downstream point. For example, defect lenses may be released and disposed of immediately before dispensing the lens into a final package. However, preferably, defect lenses are released in a station subsequent to the station for dispensing the good quality lenses into a final package. An advantage of the latter techniques is that all lens disposal, including lenses which were earlier rejected for central lens body defects, may be coordinated and accomplished at this point.

FIG. 8 illustrates the inspection of a single lens. The entire array of lenses (e.g., two columns of five rows) may be inspected by a series of cameras and lighting arrays, with a camera and light source for each lens. However, a more efficient process involves the utilization of one camera and light source for each column of lenses. Thus, two cameras, positioned below the lens array, may index through the two columns of lenses. The robotic arm with lens (from above) indexes down when the camera has indexed into position below the lens. In this manner, a smaller number of the more expensive components, i.e. the cameras, are required for the process.

14. Lens Transfer To Packaging/Scrap Disposal

Lenses which are selected for rejection, from either of the prior peripheral or central inspection stages, may be discarded simultaneously immediately prior to, or preferably subsequent to, packaging of the high quality lenses. This may be accomplished by using a database which stores and disseminates the locations of the lenses selected for disposal by the earlier body and edge inspection processes.

One preferred method of effectuating this process involves first moving the robotic arms which hold the lenses, subsequent to edge inspection, to a station above a conveyor which retains a series of individual contact lens packages. A computer which has retained the location of unacceptable lenses relays a signal to the conveyor to index forward and place an individual contact lens package beneath the lens if the lens was determined to be of acceptable quality. However, if the lens was selected for rejection, either for edge or body defects, the computer does not signal the conveyor to index an individual contact lens package forward. Regardless of whether the computer generates a conveyor indexing signal, the computer subsequently generates a signal which causes the lens to be released from the robotic arm (e.g., by closing the vacuum valve). If the packaging conveyor has been indexed forward, the lens falls into a package for subsequent distribution.

In a preferred embodiment, poor quality lenses may be discarded in a stage prior to the packaging stage. This embodiment provides for a scrap bin location spatially separated from the packaging conveyor, which offers advantages in access to both the rejection and packaging stages.

While a number of control systems may be envisioned for rejection of the poor quality lenses, there are advantages of discarding all poor quality lenses at one location. For example, this process requires only one location for scrap collections and disposal, thereby minimizing the number of scrap containers and space consumption associated therewith. However, the invention is not limited to the chosen location for disposal of poor quality lenses.

15. Saline Dispensing And Package Sealing

After the contact lens has been placed into the individual lens package, saline may be added to the package. Alternatively, saline may be added to the lens package before the lens is released into the package.

If the preferred prepolymer (see herein below) is crosslinked to form the lens, a relatively high pH saline is desired in the package. A pH of about 7 to about 9 is preferred. The relatively high pH saline is used to complete the hydrolysis of groups on the preferred poly(vinyl alcohol) backbone. Preferably, the pH is reduced during autoclaving, subsequent to package sealing, to a physiologically acceptable pH.

Once the saline and the lens have been added to the package, a seal may be releasably affixed to the package. Preferably a foil or polymer film, or a combination thereof, is applied to the package as the removable seal. The sealant film may be releasably affixed to the package via a number of methods, such as heat sealing, pressure sealing, or application of any of a number of adhesives.

One preferred contact lens package is disclosed in U.S. Pat. No. 5,409,104, assigned to Ciba-Geigy Corporation, which is incorporated herein by reference.

16. Mold Cleaning and Drying

After the lenses are removed from the molding tool, the molding tool is indexed to a tool cleaning stage. The molding tool may be washed with relatively high pressure water streams at this stage because no lenses are present which are intended for packaging, i.e., the only lenses which remain on the mold halves at this stage are scrap. First, the molding tool is thoroughly washed to remove any debris, such as strongly adhered portions of lenses, or any other undesirable material. Then, the molding tool is dried, preferably by applying air streams while simultaneously applying a slight subatmospheric pressure to remove the dislodged water.

In one preferred system, air jets are arranged around the periphery of each mold half, both male and female. A vacuum effluent tube is positioned over the center of each mold half to remove dislodged water droplets. Alternatively, air jets may be applied centrally while a peripheral vacuum removes the water. Furthermore, the vacuum effluent may be omitted if the air streams are adjusted appropriately.

After the molding tool is completely washed and dried, the tool is preferably indexed into the prepolymer dispensing position, ready for another production cycle.

17. Cyclic Series of Process Steps

A particularly advantageous and novel aspect of many embodiments of the present ophthalmic lens manufacturing processes is that one or more series of process steps are cyclic. In contrast to the typical molded lens manufacturing process, in which lenses are produced via a set of linear process steps using single-use disposable plastic molds, the present processes offer advantages in process and product consistency and reduced material and time consumption by utilizing one or more cyclic processes.

Preferably, lenses are manufactured by a series of two or more cyclic processes. In a preferred embodiment, the lenses are manufactured by a first repeating cycle which includes steps of dispensing liquid prepolymer into a reusable mold which includes male and female mold halves, forming the lens, and separating the mold halves. This preferred embodiment further includes a second repeating cycle in which the lens is removed and transferred to a packaging process.

In one preferred embodiment, a process for the manufacture of ophthalmic lenses may be operated by at least two repeating cycles, including:

(a) a repeating cycle of:
  (1) dispensing prepolymer material into a female mold half;
  (2) mating a male mold half to the female mold half;
  (3) applying radiation to crosslink and/or polymerize the prepolymer material to form an ophthalmic lens;
  (4) separating the male mold half from the female mold half;
  (5) washing the lens to remove unreacted prepolymer;
  (6) ensuring the lens is adjacent a selected mold half;
  (7) cleaning the male and female mold halves; and
  (8) indexing the male and female mold halves to a position for dispensing prepolymer; and (b) a repeating cycle of:
(1) grasping lenses in a central area to remove the lenses from the selected mold half;
(2) depositing acceptable lenses into packaging; and
(3) discarding unacceptable lenses in a waste container.

At least one of the repeating cycles preferably includes a step of inspecting said lenses. In a preferred embodiment, the lenses are inspected in a central region in the first repeating cycle, while a peripheral region or regions are inspected in the second repeating cycle.

Figure 9:
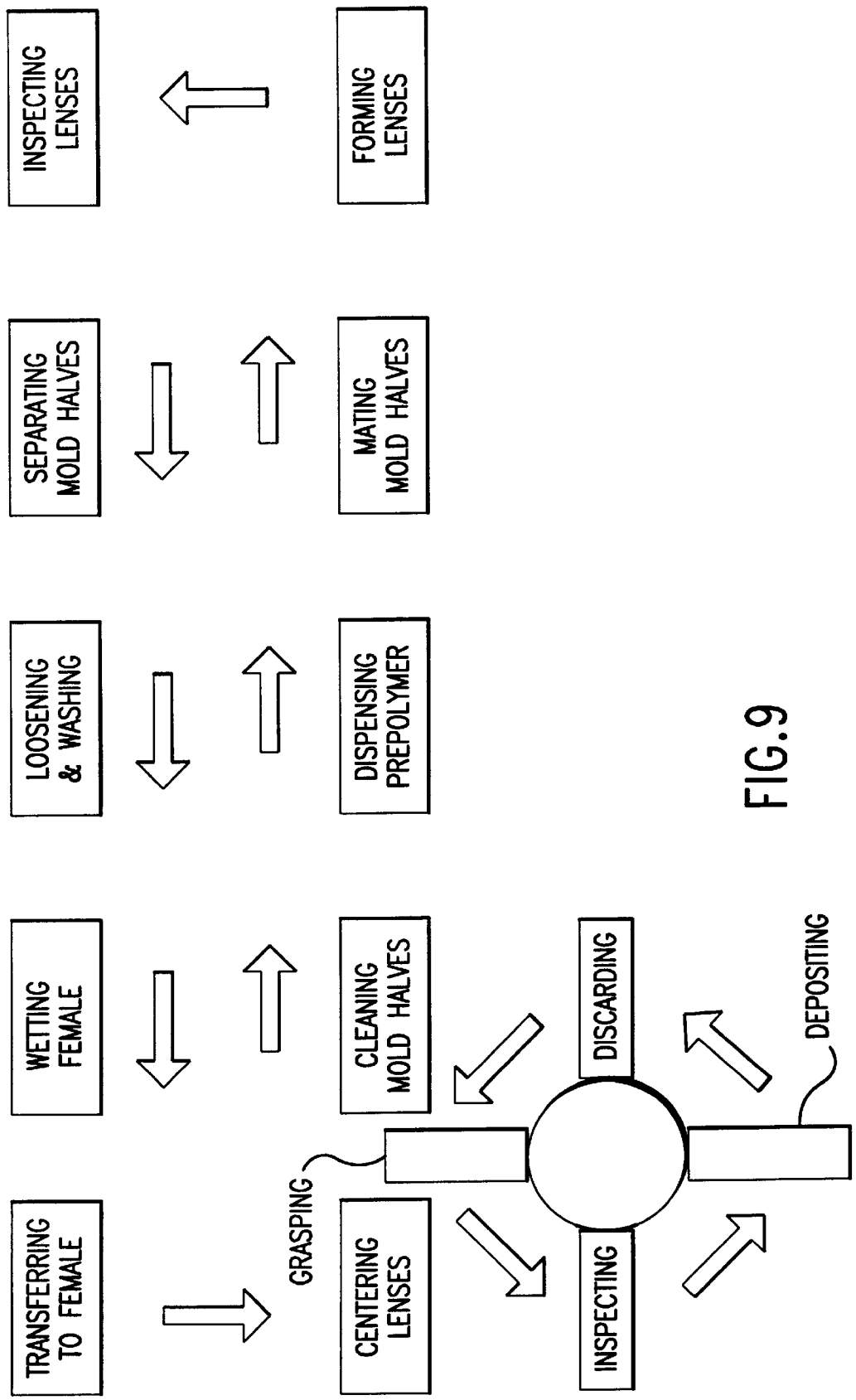
FIG. 9 is a schematic illustration of a process flow arrangement including two cyclic processes.

FIG. 9 illustrates a preferred embodiment in which the lens manufacturing process includes two cyclic processes. The first cyclic process begins with dispensing prepolymer into the female mold halves, followed by the steps of:

mating (i.e., closing) the male and female mold halves, forming the lenses (e.g., by applying UV radiation), inspecting the lenses, separating the mold halves, loosening the lenses and washing unreacted prepolymer from the lenses, wetting the female mold halves, transferring any lenses on the male mold halves to the female mold halves, and cleaning the mold halves.

After the mold halves are cleaned, the mold halves are indexed to the prepolymer dispensing stage once again.

In the FIG. 9 embodiment, subsequent to the lens centering stage, the lenses are grasped and removed in the second series of cyclic process steps. Grasping and lens removing is followed by lens inspection, depositing of high quality lenses into packaging, and discarding unacceptable lenses.

It should be noted that a wide variety of cyclic process step arrangements may be envisioned by a person having ordinary skill in the art, given the extensive disclosure contained herein. Accordingly, the broadest scope of the invention is not limited to the specific arrangement of process steps disclosed hereinbefore.

B. PREFERRED PREPOLYMER MATERIALS

The invention is not limited to a particular crosslinkable and/or polymerizable material, referred to herein also as prepolymer. However, certain prepolymers are preferred in accordance with preferred embodiments of the invention. Preferred prepolymers for use in the process according to the invention are those that are soluble in water and that comprise crosslinkable groups. In particular, preferred prepolymers include those which are described in U.S. Pat. No. 5,508,317, issued to Beat Müller on Apr. 16, 1996 and assigned to Ciba-Geigy Corporation. U.S. Pat. No. 5,508,317 in its entirety is incorporated herein by reference.

A preferred group of prepolymers, as described in U.S. Pat. No. 5,508,317, are those that comprise a 1,3-diol basic structure in which a certain percentage of the 1,3-diol units have been modified to a 1,3-dioxane having in the 2-position a radical that is polymerizable but not polymerized. The polymerizable radical is especially an aminoalkyl radical having a polymerizable group bonded to the nitrogen atom.

The prepolymer is preferably a derivative of a polyvinyl alcohol having a weight average molecular weight, $M_w$, of at least about 2,000 that, based on the number of hydroxy groups of the polyvinyl alcohol, comprises from approximately 0.5 to approximately 80% of units of formula I:

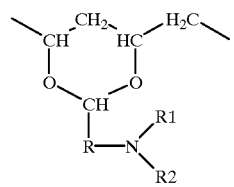

wherein:
R is lower alkylene having up to 8 carbon atoms,
$R^1$ is hydrogen or lower alkyl and
$R^2$ is an olefinically unsaturated, electron-attracting, copolymerizable radical preferably having up to 25 carbon atoms. $R^2$ is, for example, an olefinically unsaturated acyl radical of formula $R^3$—CO—, in which $R^3$ is an olefinically unsaturated copolymerizable radical having from 2 to 24 carbon atoms, preferably from 2 to 8 carbon atoms, especially preferably from 2 to 4 carbon atoms. In another embodiment, the radical R2 is a radical of formula II

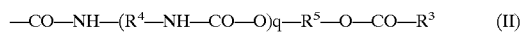

wherein
q is zero or one and
$R^4$ and $R^5$ are each independently lower alkylene having from 2 to 8 carbon atoms, arylene having from 6 to 12 carbon atoms, a saturated divalent cycloaliphatic group having from 6 to 10 carbon atoms, arylenealkylene or alkylenearylene having from 7 to 14 carbon atoms or arylenealkylenearylene having from 13 to 16 carbon atoms, and
$R^3$ is as defined above.

The preferred prepolymer is therefore especially a derivative of a polyvinyl alcohol having a molecular weight of at least about 2,000 that, based on the number of hydroxy groups of the polyvinyl alcohol, comprises from approximately 0.5 to approximately 80% of units of formula III:

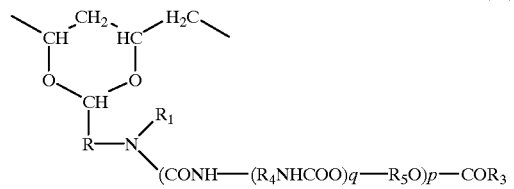

where:
R is lower alkylene,
$R^1$ is hydrogen or lower alkyl,
p is zero or one,
q is zero or one,
$R^3$ is an olefinically unsaturated copolymerizable radical having from 2 to 8 carbon atoms and
$R^4$ and $R^5$ are each independently lower alkylene having from 2 to 8 carbon atoms, arylene having from 6 to 12 carbon atoms, a saturated divalent cycloaliphatic group having from 6 to 10 carbon atoms, arylenealkylene or alkylenearylene having from 7 to 14 carbon atoms or arylenealkylenearylene having from 13 to 16 carbon atoms.

Lower alkylene R preferably has up to 8 carbon atoms and may be straight-chained or branched. Suitable examples include octylene, hexylene, pentylene, butylene, propylene, ethylene, methylene, 2-propylene, 2-butylene and 3-pentylene. Preferably lower alkylene R has up to 6 and especially preferably up to 4 carbon atoms. The meanings methylene and butylene are especially preferred.

$R^1$ is preferably hydrogen or lower alkyl having up to seven, especially up to four, carbon atoms, especially hydrogen.

Lower alkylene $R^4$ or $R^5$ preferably has from 2 to 6 carbon atoms and is especially straight-chained. Suitable examples include propylene, butylene, hexylene, dimethylethylene and, especially preferably, ethylene.

Arylene $R^4$ or $R^5$ is preferably phenylene that is unsubstituted or is substituted by lower alkyl or lower alkoxy, especially 1,3-phenylene or 1,4-phenylene or methyl-1,4-phenylene.

A saturated divalent cycloaliphatic group $R^4$ or $R^5$ is preferably cyclohexylene or cyclohexylene-lower alkylene, for example cyclohexylenemethylene, that is unsubstituted or is substituted by one or more methyl groups, such as, for example, trimethylcyclohexylenemethylene, for example the divalent isophorone radical.

The arylene unit of alkylenearylene or arylenealkylene $R^4$ or $R^5$ is preferably phenylene, unsubstituted or substituted by lower alkyl or lower alkoxy, and the alkylene unit thereof is preferably lower alkylene, such as methylene or ethylene, especially methylene. Such radicals $R^4$ or $R^5$ are therefore preferably phenylenemethylene or methylenephenylene.

Arylenealkylenearylene $R^4$ or $R^5$ is preferably phenylene-lower alkylene-phenylene having up to 4 carbon atoms in the alkylene unit, for example phenyleneethylenephenylene.

The radicals $R^4$ and $R^5$ are each independently preferably lower alkylene having from 2 to 6 carbon atoms, phenylene, unsubstituted or substituted by lower alkyl, cyclohexylene or cyclohexylene-lower alkylene, unsubstituted or substituted by lower alkyl, phenylene-lower alkylene, lower alkylene-phenylene or phenylene-lower alkylene-phenylene.

Within the scope of this invention, the term "lower" used in connection with radicals and compounds denotes radicals or compounds having up to 7 carbon atoms, preferably up to 4 carbon atoms, unless defined otherwise. Lower alkyl has especially up to 7 carbon atoms, preferably up to 4 carbon atoms, and is, for example, methyl, ethyl, propyl, butyl or tert-butyl.

Lower alkoxy has especially up to 7 carbon atoms, preferably up to 4 carbon atoms, and is, for example, methoxy, ethoxy, propoxy, butoxy or tert-butoxy.

The olefinically unsaturated copolymerizable radical $R^3$ having from 2 to 24 carbon atoms is preferably alkenyl having from 2 to 24 carbon atoms, especially alkenyl having from 2 to 8 carbon atoms and especially preferably alkenyl having from 2 to 4 carbon atoms, for example ethenyl, 2-propenyl, 3-propenyl, 2-butenyl, hexenyl, octenyl or dodecenyl. The meanings ethenyl and 2-propenyl are preferred, so that the group —CO—$R^3$ is the acyl radical of acrylic or methacrylic acid.

The divalent group —$R^4$—NH—CO—O— is present when q is one and absent when q is zero. Prepolymers in which q is zero are preferred.

The divalent group —CO—NH—($R^4$—NH—CO—O)q—$R^5$O— is present when p is one and absent when p is zero. Prepolymers in which p is zero are preferred.

In prepolymers in which p is one the index q is preferably zero. Prepolymers in which p is one, the index q is zero and $R^5$ is lower alkylene are especially preferred.

A preferred prepolymer is a derivative of a polyvinyl alcohol having a molecular weight of at least about 2000 that, based on the number of hydroxy groups of the polyvinyl alcohol, comprises from approximately 0.5 to approximately 80% of units of formula III in which R is lower alkylene having up to 6 carbon atoms, p is zero and $R^3$ is alkenyl having from 2 to 8 carbon atoms.

A further preferred prepolymer is a derivative of a polyvinyl alcohol having a molecular weight of at least about 2000 that, based on the number of hydroxy groups of the polyvinyl alcohol, comprises from approximately 0.5 to approximately 80% of units of formula III in which R is lower alkylene having up to 6 carbon atoms, p is one, q is zero, $R^5$ is lower alkylene having from 2 to 6 carbon atoms and $R^3$ is alkenyl having from 2 to 8 carbon atoms.

Yet a further preferred prepolymer is a derivative of a polyvinyl alcohol having a molecular weight of at least about 2000 that, based on the number of hydroxy groups of the polyvinyl alcohol, comprises from approximately 0.5 to approximately 80% of units of formula III in which R is lower alkylene having up to 6 carbon atoms, p is one, q is one, R4 is lower alkylene having from 2 to 6 carbon atoms, phenylene, unsubstituted or substituted by lower alkyl, cyclohexylene or cyclohexylene-lower alkylene, unsubstituted or substituted by lower alkyl, phenylene-lower alkylene, lower alkylene-phenylene or phenylene-lower alkylene-phenylene, $R^5$ is lower alkylene having from 2 to 6 carbon atoms and $R^3$ is alkenyl having from 2 to 8 carbon atoms.

The preferred prepolymers are preferably derivatives of polyvinyl alcohol having a molecular weight of at least about 2000 that, based on the number of hydroxy groups of the polyvinyl alcohol, comprises from approximately 0.5 to approximately 80%, especially approximately from 1 to 50%, preferably approximately from 1 to 25%, preferably approximately from 2 to 15% and especially preferably approximately from 3 to 10%, of units of formula III. Preferred prepolymers which are used for the manufacture of contact lenses comprise, based on the number of hydroxy groups of the polyvinyl alcohol, especially from approximately 0.5 to approximately 25%, especially approximately from 1 to 15% and especially preferably approximately from 2 to 12%, of units of formula III.

Polyvinyl alcohols that can be derivatised for obtaining a preferred prepolymer preferably have a molecular weight of at least 10,000. As an upper limit the polyvinyl alcohols may have a molecular weight of up to 1,000,000. Preferably, the polyvinyl alcohols have a molecular weight of up to 300,000, especially up to approximately 100,000 and especially preferably up to approximately 50,000.

Polyvinyl alcohols suitable in accordance with the invention usually have a poly(2-hydroxy)ethylene structure. The polyvinyl alcohols may, however, also comprise hydroxy groups in the form of 1,2-glycols, such as copolymer units of 1,2-dihydroxyethylene, as may be obtained, for example, by the alkaline hydrolysis of vinyl acetate/vinylene carbonate copolymers.

In addition, the polyvinyl alcohols for obtaining a preferred prepolymer may also comprise small proportions, for example up to 20%, preferably up to 5%, of copolymer units of ethylene, propylene, acrylamide, methacrylamide, dimethacrylamide, hydroxyethyl methacrylate, methyl methacrylate, methyl acrylate, ethyl acrylate, vinylpyrrolidone, hydroxyethyl acrylate, allyl alcohol, styrene or similar customarily used comonomers.

Commercially available polyvinyl alcohols may be used, such as, for example, Vinol® 107 produced by Air Products (MW=22,000 to 31,000, 98–98.8% hydrolysed), Polysciences 4397 (MW=25,000, 98.5% hydrolysed), BF 14 produced by Chan Chun, Elvanol® 90-50 produced by DuPont, UF-120 produced by Unitika, Moviol® 4-88, 10-98 and 20-98 produced by Hoechst. Other manufacturers are, for example, Nippon Gohsei (Gohsenol®), Monsanto (Gelvatol®), Wacker (Polyviol®) and the Japanese manufacturers Kuraray, Denki and Shin-Etsu. The molecular weights referenced herein are weight average weights, Mw, determined by gel permeation chromatography, unless otherwise specified.

As already mentioned, it is also possible to use copolymers of hydrolysed vinyl acetate, which are obtainable, for example, in the form of hydrolysed ethylene/vinyl acetate (EVA), or vinyl chloride/vinyl acetate, N-vinylpyrrolidone/vinyl acetate and maleic acid anhydride/vinyl acetate.

Polyvinyl alcohol is usually prepared by hydrolysis of the corresponding homopolymeric polyvinyl acetate. In a preferred embodiment, the polyvinyl alcohol for obtaining a preferred prepolymer comprises less than 50% of polyvinyl acetate units, especially less than 20% of polyvinyl acetate units. Preferred amounts of residual acetate units in the polyvinyl alcohol for obtaining a preferred prepolymer, based on the sum of vinyl alcohol units and acetate units, are approximately from 3 to 20%, preferably approximately from 5 to 16% and especially approximately from 10 to 14%.

The compounds comprising units of formula III may be prepared in a manner known per se.

The prepolymers of formulae I and III are extraordinarily stable. The prepolymers of formulae I and III can furthermore be purified in a manner known per se, for example by precipitation with acetone, dialysis or ultrafiltration, ultrafiltration being especially preferred. By means of that purification process the prepolymers of formulae I and III can be obtained in extremely pure form, for example in the form of concentrated aqueous solutions that are free, or at least substantially free, from reaction products.

The prepolymers of formulae I and III are crosslinkable in an extremely effective and controlled manner, especially by photocrosslinking.

Moldings may be obtained by photocrosslinking a prepolymer comprising units of formula I or III in the absence or presence of an additional vinylic comonomer. Those polymers are water-insoluble.

In the case of photocrosslinking, it is appropriate to add a photoinitiator which can initiate radical crosslinking. The photopolymerization may occur in the presence of a solvent, which is preferably water.

The photocrosslinking is carried out preferably directly from an aqueous solution of the preferred prepolymers, which can be obtained by the preferred purification step, ultrafiltration, where appropriate after the addition of an additional vinylic comonomer. For example, an approximately 15 to 40% aqueous solution can be photocrosslinked.

The vinylic comonomer which, in accordance with the invention, may be used in addition in the photocrosslinking, may be hydrophilic or hydrophobic, or a mixture of a hydrophobic and a hydrophilic vinylic monomer. Suitable vinylic monomers include especially those customarily used in the manufacture of contact lenses, and are known to persons having ordinary skill in the art.

Generally, approximately from 0.01 to 80 units of a typical vinylic comonomer react per unit of formula I or III.

If a vinylic comonomer is used, the crosslinked polymers preferably comprise approximately from 1 to 15%, especially preferably approximately from 3 to 8%, of units of formula I or III, based on the number of hydroxy groups of the polyvinyl alcohol, which are reacted with approximately from 0.1 to 80 units of the vinylic monomer.

The proportion of the vinylic comonomers, if used, is preferably from 0.5 to 80 units per unit of formula I, especially from 1 to 30 units per unit of formula I, and especially preferably from 5 to 20 units per unit of formula I.

The preparation of a substantially aqueous solution of a water-soluble prepolymer that comprises crosslinkable groups can be carried out in a manner known per se, for example by synthesis of the prepolymer in a substantially aqueous solution or by isolation of the prepolymer for example in pure form (i.e., free from undesired constituents) and dissolution thereof in a substantially aqueous medium.

Substantially aqueous solutions of the prepolymer comprise especially solutions of the prepolymer in water, in aqueous salt solutions, especially in aqueous same solutions that have an osmolarity of approximately from 200 to 450 milliosmol per 1000 ml (unit: mOsm/l), preferably an osmolarity of approximately from 250 to 350 mOsm/l, especially approximately 300 mOsm/l, or in mixtures of water or aqueous salt solutions with physiologically tolerable polar organic solvents, such as, for example, glycerol. Solutions of the prepolymer in water or in aqueous salt solutions are preferred.

The substantially aqueous solution of the prepolymer defined hereinbefore is preferably a pure solution which means a solution which is free or essentially free from undesired constituents. Especially preferred examples of such solutions are a solution of the prepolymer in pure water or in an artificial lacrimal fluid.

The viscosity of the solution of the prepolymer in the substantially aqueous solution is, within wide limits, not critical, but the solution should preferably be a flowable solution that can be deformed strain-free.

The molecular weight of the prepolymer is also, within wide limits, not critical. Preferably, however, the prepolymer has a molecular weight of from approximately 10,000 to approximately 200,000.

In a preferred embodiment, the prepolymer contains crosslinkable groups. "Crosslinkable groups" denotes customary crosslinkable groups well-known to the person skilled in the art, such as, for example, photocrosslinkable or thermally crosslinkable groups. Crosslinkable groups such as those already proposed for the preparation of contact lens materials are especially suitable. Those include especially, but not exclusively, groups comprising carbon-carbon double bonds. To demonstrate the large variety of suitable crosslinkable groups, there are mentioned here, merely by way of example, the following crosslinking mechanisms: radical polymerization, 2+2 cyclo-addition, Diels-Alder reaction, ROMP (Ring Opening Metathesis Polymerization), vulcanisation, cationic crosslinking and epoxy hardening.

Suitable water-soluble prepolymers that comprise crosslinkable groups are, for example, compounds comprising units of formula I. It is also possible, however, to use in the process other water-soluble prepolymers that comprise a polymeric backbone and also crosslinkable groups.

Suitable polymeric backbones include, besides polyvinyl alcohol, materials such as those already proposed in some cases as contact lens materials, for example polymeric diols other than PVA, polymers comprising saccharides, polymers comprising vinylpyrrolidone, polymers comprising alkyl (meth)acrylates, polymers comprising alkyl(meth)acrylates that have been substituted by hydrophilic groups, such as by hydroxy, carboxy or by amino, polyalkylene glycols, or copolymers or mixtures thereof.

The prepolymer used in accordance with the invention preferably comprises crosslinkable groups in an amount of from approximately 0.5 to approximately 80% equivalents, based on the equivalents of monomers that form the polymeric backbone, especially approximately from 1 to 50%, preferably approximately from 1 to 25%, preferably approximately from 2 to 15% and especially preferably approximately from 3 to 10%. Also especially preferred are amounts of crosslinkable groups of from approximately 0.5 to approximately 25% equivalents, especially approximately from 1 to 15% and especially preferably approximately from 2 to 12%, based on the equivalents of monomers that form the polymeric backbone.

As already mentioned, a criterion for the suitability of a preferred prepolymer is that it is a crosslinkable prepolymer, but the prepolymer is uncrosslinked, or at least substantially uncrosslinked, so that it is water-soluble.

In addition, the prepolymer is advantageously stable in the uncrosslinked state, so that it can be subjected to purification as described hereinbefore in connection with compounds comprising units of formula I. The prepolymers are preferably used in form of a pure solution in the process according to the invention. The prepolymers can be converted into the form of a pure solution for example in the manner disclosed hereinafter.

Preferably, the prepolymers used in the process according to the invention can be purified in a manner known per se, for example by precipitation with organic solvents, such as acetone, filtration and washing, extraction in a suitable solvent, dialysis or ultrafiltration, ultrafiltration being especially preferred. By means of that purification process the prepolymers can be obtained in extremely pure form, for example in the form of concentrated aqueous solutions that are free, or at least substantially free, from reaction products, such as salts, and from starting materials, such as, for example, non-polymeric constituents.

The preferred purification process for the prepolymers used in the process according to the invention, ultrafiltration, can be carried out in a manner known per se. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the sodium chloride content of the solution, which can be determined simply in known manner.

In a preferred embodiment of the process according to the invention there is prepared a substantially aqueous solution of the prepolymer that is substantially free from undesired constituents, such as, for example, free from monomeric, oligomeric or polymeric starting compounds used for the preparation of the prepolymer, and/or free from secondary products formed during the preparation of the prepolymer. The substantially aqueous solution is more preferably a pure aqueous solution or a solution in an artificial lacrimal fluid, as defined hereinbefore. It is also preferable to carry out the process according to the invention without the addition of a comonomer, for example a vinylic comonomer.

On the basis of one of the measures mentioned in the above paragraph, and especially on the basis of a combination of the measures mentioned in the above paragraph, the solution of the prepolymer used in the process according to the invention is one that comprises no, or substantially no, undesired constituents that would have to be extracted after a crosslinking operation. A particular feature of this preferred embodiment of the process according to the invention is therefore that the extraction of undesired constituents following crosslinking can be dispensed with.

The process according to the invention is therefore preferably carried out in such a manner that the substantially aqueous solution of the water-soluble prepolymer comprising crosslinkable groups is free or substantially free of undesired constituents, such as especially monomeric, oligomeric or polymeric starting compounds used for the preparation of the prepolymer, or secondary products that have formed during the preparation of the prepolymer, and/or that the solution is used without the addition of a comonomer, so that the extraction of any undesired constituents in the further course of the process can be dispensed with.

One additive that is added, where appropriate, to the solution of the prepolymer is an initiator for the crosslinking, should an initiator be required for crosslinking the crosslinkable groups. That may be the case especially if the crosslinking is carried out by photocrosslinking, which is preferred in the process according to the invention. In the case of photocrosslinking, it is appropriate to add a photoinitiator which can initiate radical crosslinking. Examples thereof are familiar to the person skilled in the art and suitable photoinitiators that may be mentioned specifically are benzoin methyl ether, 1-hydroxycyclohexylphenyl ketone, or a commercial product such as DAROCUR® or IRGACUR® types, e.g. DAROCUR® 1173 or IRGACUR® 2959.

The crosslinking is triggered in the mold, for example by actinic radiation, such as, for example, UV light, or by ionising radiation, such as, for example, gamma radiation, electron radiation or X radiation. Ultraviolet (UV) radiation is preferred. The crosslinking can where appropriate also be triggered thermally. Attention is drawn to the fact that the crosslinking can be carried out according to the invention in a very short time, for example in less than five minutes, preferably in less than one minute, more preferably in up to 30 seconds, and especially in less than 10 seconds.

Since the solution of the prepolymer preferably does not comprise any undesired low-molecular constituents, the crosslinked product, too, does not comprise any such constituents. Therefore subsequent extraction is not necessary. Since the crosslinking is carried out in a substantially aqueous solution, subsequent hydration is not necessary. Those two advantages mean, inter alia, that a complicated after-treatment of the resulting moldings, especially contact lenses, is dispensed with. The contact lenses obtainable in accordance with the process according to the invention are therefore distinguished by the fact that they are suitable for their intended use without extraction. "Intended use" in this context means especially that the contact lenses can be used on the human eye. The contact lenses obtainable in accordance with the process according to the invention are also distinguished by the fact that they are suitable for their intended use without hydration.

The invention has been described in detail, with reference to certain preferred embodiments, in order to enable the reader to practice the invention without undue experimentation. However, a person having ordinary skill in the art will readily recognize that many of the components and parameters may be varied or modified to a certain extent without departing from the scope and spirit of the invention. Furthermore, titles, headings, definitions or the like are provided to enhance the reader's comprehension of this document, and should not be read as limiting the scope of the present invention. Accordingly, the intellectual property rights to this invention are defined only by the following claims and reasonable extensions and equivalents thereof.

That which is claimed is:

1. A cyclic process for producing a plurality of moldings, comprising:

(a) dispensing prepolymer material into a female mold half;
(b) mating a male mold half to the female mold half;
(c) applying radiation to crosslink and/or polymerize the prepolymer material to form a molding;
(d) separating the male mold half from the female mold half;
(e) washing the molding to remove unreacted prepolymer;
(f) ensuring the molding is adjacent a selected mold half;
(g) grasping the molding in a central area to remove the molding from the selected mold half;
(h) depositing an acceptable molding into packaging;
(i) cleaning the male and female mold halves; and
(j) indexing the male and female mold halves to a position for dispensing prepolymer.

2. A process of claim 1, wherein said process includes at least one step of inspecting the moldings.

3. A process of claim 2, wherein said inspecting comprises:
(1) inspecting central portions of the molding for defects; and
(2) inspecting peripheral regions of the molding for defects.

4. A process of claim 1, wherein said process further comprises the step of centering the molding within the female mold half prior to the step of grasping the molding in a central area to remove the moldings from the mold half.

5. A process of claim 3, further comprising at least partially drying the molding to remove surface water which may impair inspection of the moldings prior to the step of inspecting the edges of the moldings for defects.

6. A process of claim 3, wherein said inspecting of central portions of the moldings for defects occurs immediately subsequent to said step of applying radiation to crosslink and/or polymerize the prepolymer material.

7. A process of claim 1, wherein the cycle time for each step is less than about one minute.

8. A process of claim 7, wherein the cycle time for each step is less than about 10 seconds.

9. A process of claim 1, wherein the step of ensuring the molding is adjacent the selected mold half comprises a step of transferring any moldings resting on the non-selected mold half to the corresponding selected mold half.

10. A process of claim 9, wherein the selected mold half is the female mold half and the non-selected mold half is the male mold half.

11. A process for producing a plurality of moldings utilizing a plurality of molds, comprising:
(a) dispensing prepolymer into female mold halves;
(b) mating male mold halves to the female mold halves;
(c) applying radiation to crosslink the crosslinkable material to form moldings;
(d) inspecting central portions of the moldings for defects;
(e) separating the male mold halves from the female mold halves;
(f) washing the mold halves to remove unreacted crosslinkable material;
(g) transferring any moldings on the male mold halves to the female mold halves;
(h) centering the moldings within the female mold halves;
(i) grasping the moldings in a central area to remove the moldings from the mold halves;
(j) at least partially drying the moldings to remove surface water which may impair inspection of the moldings;
(k) inspecting the edges of the moldings for defects;
(l) depositing acceptable moldings into packaging;
(m) cleaning the male and female mold halves; and
(n) indexing the male and female mold halves to a position for dispensing crosslinkable material.

12. A process of claim 1, wherein said prepolymer is a derivative of a polyvinyl alcohol having a weight average molecular weight $M_w$ of at least about 2,000 that, based on the number of hydroxy groups of the polyvinyl alcohol, comprises from approximately 0.5 to approximately 80% of units of formula I:

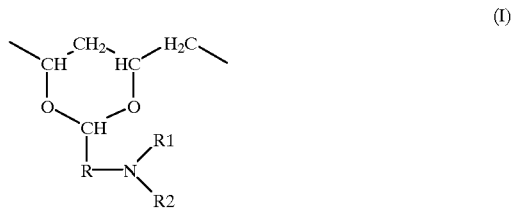

wherein:
R is lower alkylene having up to 8 carbon atoms,
$R^1$ is hydrogen or lower alkyl and
$R^2$ is an olefinically unsaturated, electron-attracting, copolymerizable radical.

13. A process of claim 1, wherein said moldings are ophthalmic lenses.

14. A molding process of claim 13, wherein said ophthalmic lenses are contact lenses.

15. A process of claim 11, wherein said moldings are ophthalmic lenses.

16. A process of claim 1, wherein said dispensing is conducted in an atmosphere having a relative humidity of at least 55%.

17. A process of claim 1, wherein said dispensing is conducted through a dispensing tip which remains in contact with said polymerizable and/or crosslinkable material upon completion of the dispensing.

18. A process of claim 1, wherein the mold halves are reused to produced at least 10,000 moldings.

19. A process of claim 1, which utilizes a molding assembly housing a plurality of removable male and female mold halves, comprising a male molding assembly housing a plurality of male mold halves removably affixed thereto; and a female molding assembly housing a plurality of female mold halves removably affixed thereto, wherein the mating of the male and female mold halves is accomplished by:
(a) articulating the male assembly in an arcuate movement; and
(b) subsequently moving the male assembly substantially linearly to a position in which the male and female mold halves mate.

20. A process of claim 1, wherein a plurality of male mold halves are mated with a plurality of corresponding female mold halves and all of said mating occurs substantially simultaneously.

21. A process for the manufacture of ophthalmic lenses, wherein said process includes more than one series of steps which are cyclic in nature, comprising: (a) a first repeating cycle which includes the steps of: (1) dispensing liquid prepolymer into a reusable mold which includes male and female mold halves; (2) forming the lens; and (3) separating the mold halves; and (b) a second repeating cycle including:

(1) removing the lens from a mold half; and (2) transferring the lens to a packaging process, wherein:
(a) the first repeating cycle includes the steps of:
(1) dispensing prepolymer material into a female mold half;
(2) mating a male mold half to the female mold half;
(3) applying radiation to crosslink and/or polymerize the prepolymer material to form an ophthalmic lens;
(4) separating the male mold half from the female mold half;
(5) washing the lens to remove unreacted prepolymer;
(6) ensuring the lens is adjacent a selected mold half;
(7) cleaning the male and female mold halves; and
(8) indexing the male and female mold halves to a position for dispensing prepolymer; and
(b) the second repeating cycle includes the steps of:
(1) grasping lenses in a central area to remove the molding from the selected mold half;
(2) depositing acceptable moldings into packaging; and
(3) discarding unacceptable lenses in a waste container, wherein at least one of said repeating cycles includes a step of inspecting said lenses.

22. A process for the manufacture of ophthalmic lenses, wherein said process includes more than one series of steps which are cyclic in nature, comprising: (a) a first repeating cycle which includes the steps of: (1) dispensing liquid prepolymer into a reusable mold which includes male and female mold halves; (2) forming the lens; and (3) separating the mold halves; and (b) a second repeating cycle including: (1) removing the lens from a mold half; and (2) transferring the lens to a packaging process, wherein:
(a) the first repeating cycle includes the steps of:
(1) dispensing prepolymer material into a female mold half,
(2) mating a male mold half to the female mold half;
(3) applying radiation to crosslink and/or polymerize the prepolymer material to form an ophthalmic lens;
(4) separating the male mold half from the female mold half;
(5) washing the lens to remove unreacted prepolymer;
(6) ensuring the lens is adjacent a selected mold half;
(7) inspecting a central region of the ophthalmic lens;
(8) cleaning the male and female mold halves; and
(9) indexing the male and female mold halves to a position for dispensing prepolymer; and
(b) the second repeating cycle includes the steps of:
(1) grasping lenses in a central area to remove the molding from the selected mold half,
(2) inspecting a peripheral region of the ophthalmic lens;
(3) depositing acceptable moldings into packaging; and
(4) discarding unacceptable lenses in a waste container.

23. A process of claim 21, wherein the molds are reused at least 10,000 times.

24. A process of claim 21, wherein the process is complete in less than about 20 minutes.

25. A process of claim 22, wherein the molds are reused at least 10,000 times.

26. A process of claim 22, wherein the process is complete in less than about 20 minutes.

27. A cyclic process for producing a plurality of moldings, comprising:
(a) dispensing prepolymer material into a female mold half;
(b) mating a male mold half to the female mold half;
(c) applying radiation to crosslink and/or polymerize the prepolymer material to form a molding;
(d) separating the male mold half from the female mold half;
(e) washing the molding to remove unreacted prepolymer;
(f) ensuring the molding is adjacent a selected mold half;
(g) grasping the molding in a central area to remove the molding from the selected mold half;
(h) depositing an acceptable molding into packaging;
(i) cleaning and drying the male and female mold halves; and
(j) indexing the male and female mold halves to a position for dispensing prepolymer
wherein said moldings are suitable for their intended use without extraction.

28. A process of claim 27, wherein said process includes at least one step of inspecting the moldings.

29. A process of claim 28, wherein said inspecting comprises:
(1) inspecting central portions of the molding for defects; and
(2) inspecting peripheral regions of the molding for defects.

30. A process of claim 27, wherein said process further comprises the step of centering the molding within the female mold half prior to the step of grasping the molding in a central area to remove the moldings from the mold half.

31. A process of claim 29, further comprising at least partially drying the molding to remove surface water which may impair inspection of the moldings prior to the step of inspecting the edges of the moldings for defects.

32. A process of claim 29, wherein said inspecting of central portions of the moldings for defects occurs immediately subsequent to said step of applying radiation to crosslink and/or polymerize the prepolymer material.

33. A process of claim 27, wherein the cycle time for each step is less than about one minute.

34. A process of claim 33, wherein the cycle time for each step is less than about 10 seconds.

35. A process of claim 27, wherein the step of ensuring the molding is adjacent the selected mold half comprises a step of transferring any moldings resting on the non-selected mold half to the corresponding selected mold half.

36. A process of claim 35, wherein the selected mold half is the female mold half and the non-selected mold half is the male mold half.

37. A process for producing a plurality of moldings utilizing a plurality of molds, comprising:
(a) dispensing prepolymer into female mold halves;
(b) mating male mold halves to the female mold halves;
(c) applying radiation to crosslink the crosslinkable material to form moldings;
(d) inspecting central portions of the moldings for defects;
(e) separating the male mold halves from the female mold halves;
(f) washing the mold halves to remove unreacted crosslinkable material;
(g) transferring any moldings on the male mold halves to the female mold halves;
(h) centering the moldings within the female mold halves;
(i) grasping the moldings in a central area to remove the moldings from the mold halves;
(j) at least partially drying the moldings to remove surface water which may impair inspection of the moldings;
(k) inspecting the edges of the moldings for defects;
(l) depositing acceptable moldings into packaging;

(m) cleaning the male and female mold halves; and
(n) indexing the male and female mold halves to a position for dispensing crosslinkable material
wherein said moldings are suitable for their intended use without extraction.

38. A process of claim 27, wherein said prepolymer is a derivative of a polyvinyl alcohol having a weight average molecular weight Mw of at least about 2,000 that, based on the number of hydroxy groups of the polyvinyl alcohol, comprises from approximately 0.5 to approximately 80% of units of formula I

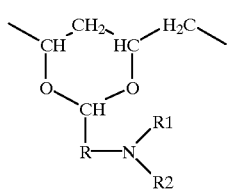

wherein:
R is lower alkylene having up to 8 carbon atoms,
R1 is hydrogen or lower alkyl and
R2 is an olefinically unsaturated, electron-attracting, copolymerizable radical.

39. A process of claim 27, wherein said moldings are ophthalmic lenses.

40. A molding process of claim 39, wherein said ophthalmic lenses are contact lenses.

41. A process of claim 37, wherein said moldings are ophthalmic lenses.

42. A process of claim 27, wherein said dispensing is conducted in an atmosphere having a relative humidity of at least 55%.

43. A process of claim 27, wherein said dispensing is conducted through a dispensing tip which remains in contact with said polymerizable and/or crosslinkable material upon completion of the dispensing.

44. A process of claim 27, wherein the mold halves are reused to produced at least 10,000 moldings.

45. A process of claim 27, which utilizes a molding assembly housing a plurality of removable male and female mold halves, comprising a male molding assembly housing a plurality of male mold halves removably affixed thereto; and a female molding assembly housing a plurality of female mold halves removably affixed thereto, wherein the mating of the male and female mold halves is accomplished by:
   (a) articulating the male assembly in an arcuate movement; and
   (b) subsequently moving the male assembly substantially linearly to a position in which the male and female mold halves mate.

46. A process of claim 27, wherein a plurality of male mold halves are mated with a plurality of corresponding female mold halves and all of said mating occurs substantially simultaneously.

* * * * *